US009766141B2

(12) United States Patent
Preston et al.

(10) Patent No.: US 9,766,141 B2
(45) Date of Patent: Sep. 19, 2017

(54) SYSTEM AND METHOD FOR DYNAMIC EVENT BASED IP ADDRESSING

(71) Applicant: Adelos, Inc., Polson, MT (US)

(72) Inventors: Dan Alan Preston, Bainbridge Island, WA (US); Calvin Hewitt, Suquamish, WA (US); James Alexander Philp, Polson, MT (US)

(73) Assignee: Adelos, Inc., Polson, MT (US)

( * ) Notice: Subject to any disclaimer, the term of this patent is extended or adjusted under 35 U.S.C. 154(b) by 0 days.

(21) Appl. No.: 15/154,161

(22) Filed: May 13, 2016

(65) Prior Publication Data

US 2016/0252414 A1  Sep. 1, 2016

Related U.S. Application Data

(63) Continuation of application No. 14/837,592, filed on Aug. 27, 2015, and a continuation-in-part of (Continued)

(51) Int. Cl.
| *G01L 1/24* | (2006.01) |
| *G01B 11/16* | (2006.01) |
| *G01H 9/00* | (2006.01) |
| *G01B 9/02* | (2006.01) |
| *G01M 11/00* | (2006.01) |
| *H04B 10/077* | (2013.01) |
| *H04B 10/2575* | (2013.01) |
| *G01D 5/353* | (2006.01) |

(52) U.S. Cl.
CPC ............ *G01L 1/242* (2013.01); *G01B 9/0209* (2013.01); *G01B 11/161* (2013.01); *G01D 5/35319* (2013.01); *G01H 9/004* (2013.01); *G01M 11/319* (2013.01); *G01M 11/3145* (2013.01); *H04B 10/0775* (2013.01); *H04B 10/2575* (2013.01)

(58) Field of Classification Search
CPC ........... G01L 1/242; G01L 1/241; G01L 1/00; H04B 10/0775; H04B 10/2575; G01M 11/319; G01M 11/3145; G01H 9/004; G01P 1/00; G01D 5/00; G01D 5/35319; G01B 11/16; G01B 9/0209; G01B 11/161
See application file for complete search history.

(56) References Cited

U.S. PATENT DOCUMENTS

| 6,236,652 B1 | 5/2001 | Preston et al. |
| 7,646,944 B2 | 1/2010 | Kaplan |
| (Continued) | | |

FOREIGN PATENT DOCUMENTS

| CN | 201829006 | 5/2011 |

*Primary Examiner* — Michael P Lapage
(74) *Attorney, Agent, or Firm* — Lee & Hayes, PLLC

(57) ABSTRACT

Systems and methods are disclosed for dynamic addressing of optical fiber sensors in fiber optic interferometry systems. Events that occur along the optical fiber span have defining attributes such as location along the optical fiber span, type, magnitude, time of occurrence, and duration. The event attributes may be used to dynamically form a unique address that fully defines and identifies the event. Other information, such as the corresponding identifier for one or more of the optical fiber span and the corresponding fiber optic interrogator may be included as part of the unique address.

20 Claims, 15 Drawing Sheets

Related U.S. Application Data application No. 14/837,609, filed on Aug. 27, 2015, and application No. 14/837,592, Aug. 27, 2015.

(60) Provisional application No. 62/042,994, filed on Aug. 28, 2014, provisional application No. 62/042,997, filed on Aug. 28, 2014, provisional application No. 62/042,999, filed on Aug. 28, 2014, provisional application No. 62/043,002, filed on Aug. 28, 2014, provisional application No. 62/043,004, filed on Aug. 28, 2014, provisional application No. 62/043,007, filed on Aug. 28, 2014, provisional application No. 62/043,009, filed on Aug. 28, 2014, provisional application No. 62/043,015, filed on Aug. 28, 2014, provisional application No. 62/043,017, filed on Aug. 28, 2014, provisional application No. 62/043,023, filed on Aug. 28, 2014, provisional application No. 62/043,026, filed on Aug. 28, 2014, provisional application No. 62/043,029, filed on Aug. 28, 2014, provisional application No. 62/043,031, filed on Aug. 28, 2014, provisional application No. 62/043,034, filed on Aug. 28, 2014, provisional application No. 62/042,896, filed on Aug. 28, 2014, provisional application No. 62/199,098, filed on Jul. 30, 2015, provisional application No. 62/042,989, filed on Aug. 28, 2014.

(56) References Cited

U.S. PATENT DOCUMENTS

| | | | |
|---|---|---|---|
| 2009/0006840 A1* | 1/2009 | Birger | H04L 29/12207 713/151 |
| 2009/0222541 A1 | 9/2009 | Monga et al. | |
| 2016/0124407 A1* | 5/2016 | Kallio | H04L 29/08 700/86 |

* cited by examiner

SYSTEM AND METHOD FOR DYNAMIC EVENT BASED IP ADDRESSING

CROSS REFERENCE TO RELATED PATENT APPLICATIONS

This application is a continuation-in-part of U.S. Utility patent application Ser. No. 14/837,592, filed on Aug. 27, 2015, entitled "Noise Management for Optical Time Delay Interferometry", and a continuation-in-part of U.S. Utility patent application Ser. No. 14/837,609 filed on Aug. 27, 2015, entitled "Real-Time Fiber Optic Interferometry Controller", which both claim benefit of U.S. Provisional Patent Application No. 62/042,989 filed on Aug. 28, 2014, entitled "System and Method for Electro Optical Modulation", U.S. Provisional Patent Application No. 62/042,994 filed on Aug. 28, 2014, entitled "System and Method for Acousto-Optical Modulation", U.S. Provisional Patent Application No. 62/042,997 filed on Aug. 28, 2014, entitled "System and Method for Fidelity up to 24,000 HZ", U.S. Provisional Patent Application No. 62/042,999 filed on Aug. 28, 2014, entitled "Fiber-Optic Based Sensing System and Methods Using Virtual Correlation Cells", U.S. Provisional Patent Application No. 62/043,002 filed on Aug. 28, 2014, entitled "System and Method for the Control Panel", U.S. Provisional Patent Application No. 62/043,004 filed on Aug. 28, 2014, entitled "System and Method for the Hardware Control Panel and Diagnostics", U.S. Provisional Patent Application No. 62/043,007 filed on Aug. 28, 2014, entitled "System and Method for Detection Logic", U.S. Provisional Patent Application No. 62/043,009 filed on Aug. 28, 2014, entitled "System and Method for Telemetry Recording and Display", U.S. Provisional Patent Application No. 62/043,015 filed on Aug. 28, 2014, entitled "System and Method for Audio Extension to Wave Convertor", U.S. Provisional Patent Application No. 62/043,017 filed on Aug. 28, 2014, entitled "System and Method for Filtering High Low Band Pass", U.S. Provisional Patent Application No. 62/04,323 filed on Aug. 28, 2014, entitled "System and Method for the Waterfall Display", U.S. Provisional Patent Application No. 62/043,026 filed on Aug. 28, 2014, entitled "System and Method for Dynamic Characterization of Fiber Optic Sensor Array", U.S. Provisional Patent Application No. 62/043,029 filed on Aug. 28, 2014, entitled "System and Method for Improved in Situ Measurements Using Fiber Optic Sensor Array", U.S. Provisional Patent Application No. 62/043,031 filed on Aug. 28, 2014, entitled "System and Method for Enhanced Event Identification and Tracking Using Fiber Optic Sensor Array", U.S. Provisional Patent Application No. 62/043,034 filed on Aug. 28, 2014, entitled "System and Method for Improved Identification, Classification, and Prediction of Micro-Seismic and Audible Events Using a Fiber Optic Sensor Array", U.S. Provisional Patent Application No. 62/042,896 filed on Aug. 28, 2014, entitled "System and Method for Demodulating Rayleigh Backscattered Signals", and U.S. Provisional Patent Application No. 62/199,098 filed on Jul. 30, 2015, entitled "System and Method for Fiber Optic Sensing", which applications are hereby incorporated in their entirety by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

The present invention relates to fiber optic sensing, and in particular to distributed acoustic sensing (DAS). More specifically, it relates to systems and methods that comprise an integrated fiber optic interrogator and an embedded controller configured to operate as a server in the Internet of Things, wherein the addressing from events detected are globally unique, dynamic, and comprise information derived from the detected event.

BACKGROUND

Fiber optic sensors are increasingly being used as devices for sensing quantities such as temperature, mechanical strain, displacements, vibrations, pressure, acceleration, rotations, or chemical concentrations. In fiber optic sensors, light is sent through an optical fiber and the returning backscattered light is analyzed. Changes in the parameters of the returning light, as compared to the input light signal baseline, may be measured and tracked.

By phase differencing the reflected signal with a reference signal, minute changes can be detected; these relate directly to the event that is causing the laser signals to be reflected. As one example, acoustic pressure waves in the vicinity of a fiber cable will impart micro strains on the fiber. These micro strains are proportional to the acoustic pressure waves, essentially imparting the frequency of the acoustic pressure wave into the back reflected signal; this is generally referred to as a modulating a signal. Phase differencing the reflected signal allows the signal to be demodulated and the acoustic pressure wave reconstructed. This technology essentially turns a fiber optic cable into a microphone over a full range of a fiber optic installation; events are now based on time of flight of an event.

Advancements in computing technology, in particular the evolution of real-time computing systems, has now allowed these fiber optic sensors to operate as real-time distributed acoustic sensor networks capable of observing, reporting, and processing various real-world phenomena in a time-sensitive manner. Additionally, the growth of the internet has led to a generally rapid growth of various internet based sensors on various networks; these various networks are used in numerous applications, including military, industrial, and civilian applications and generally adapted to detect or monitor certain events or conditions.

A sensor may be simple, such as a device that monitors temperature, or more complex, such as a video camera. Data generated at the sensor is transmitted in data packets over a sensor network to one or more application nodes. An application node includes one or more application software instantiations that can react to the sensor data, and may include a user interface that presents the sensor data in at least one of numerical, textual, and graphical forms to users.

Sensors have been used for industrial applications and commercial applications in the past; more recently, sensors have been used for homeland security and public safety applications. Sensors are transitioning from federated (stand-alone) implementations to dynamic packet-based systems connected by networks over shared infrastructure including wired and wireless communication networks. Examples of applications for fiber optic DAS sensor networks include acoustic detection in support of surveillance, environmental monitoring, etc. Buried fiber optic DAS systems are suitable for harsh environments and wide geographical areas where unattended operation of sensors is desirable.

The ability to manage these new sensor networks has become increasingly difficult as a function of the volume deployed increases. Today, centralized application nodes communicate directly to sensor gateways, these sensor gateways typically do not maintain a local list of it sensors. Instead, each application maintains a statically defined list of sensors with which the application can communicate. Home security systems operate this way, and typically use a dial up modem, the dial up modem speaks to a sensor gateway operating at a call center. Generally, the ability of an application in the call center to interact with other sensors is limited without knowledge of their physical addresses or the associated network access devices. Moreover, the introduction of new sensors to the network typically requires a manual reconfiguration to permit the application to communicate with such sensors.

What is needed is a means to scale, manage, access, and track sensors of various types that are geographically distributed and connected to a network through various network access mechanisms. The present invention satisfies this need and provides additional advantages. In a DAS system, the data derived from events are unique to the time of flight resulting in a range determination, signal classification, time of detection, interrogation unit used, etc. This data is reasonably unique to other data obtained from similar systems. Today, the ecosystem of the internet is dynamic and rapidly changing, where cloud based architectures are becoming more appealing and attainable at manageable costs.

The place to start re-thinking addressing is at the source of data, where the data source is in an abstracted mode and operates as a server. The systems and methods described in this patent are well suited to support a system of virtual sensors that implement a dynamic data driven addressing scheme that generates unique addresses based on the data detected.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

Noise Management for Optical Time Delay Interferometry, Ser. No. 14/837,592 filed Aug. 27, 2015, with a priority date of Aug. 28, 2014, which is herein incorporated by reference in its entirety.

Real-Time Fiber Optic Interferometry Controller, Ser. No. 14/837,609 filed Aug. 27, 2015, with a priority date of Aug. 28, 2014, which is herein incorporated by reference in its entirety.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Although the best understanding of the present invention will be had from a through reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

Other features of the present invention will be apparent from the accompanying drawings and from the detailed description that follows. Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently preferred embodiments of the invention are illustrated in the accompanying drawings, in which.

DETAILED DESCRIPTION

Figure 1:
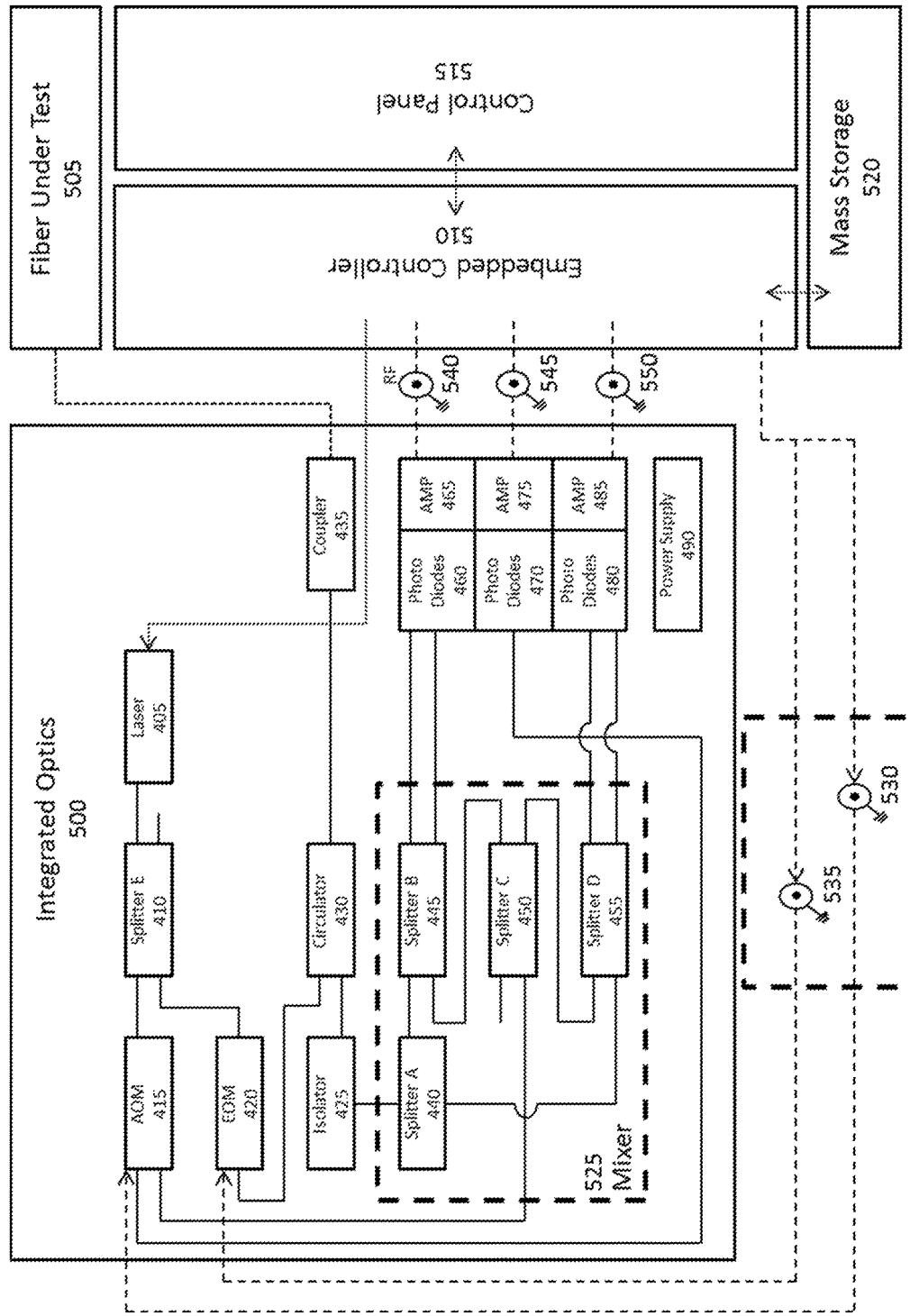
FIG. 1 depicts the base configuration of an integrated fiber optic interrogator and data logger.

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the invention may be practiced. It is to be understood that other embodiments may be utilized and structural and functional changes may be made without departing from the scope of the invention.

In the following examples, references are made to the accompanying drawings which form a part hereof, and in which is shown by way of illustration various examples in which the invention may be practiced. It is to be understood that other examples may be utilized and structural and functional changes may be made without departing from the scope of the invention.

In one aspect, a system and method are disclosed for implementing a data driven dynamic addressing scheme based on micro-strain events that generate backscattered signals from virtual sensors along a span of fiber; where the virtual sensors can be uniquely identified from an, for all intents and purposes of this discussion, nearly an infinite number of locations along the span, and where the virtual sensors can detect one of numerous strains induced into the fiber, these include but are not limited to acoustic, magnetic, mechanical, thermal, RF, and nuclear event. The virtual sensors have a dimension of time, frequency, amplitude, polarity and time of flight, where each of these dimensions can change infinitely over time. The data generated results in the dynamic address of the virtual sensor based on event classification, where the event classification determines the message type, message priority, routing, and destination of the event data. The steps include using a fiber optic interferometer as a fiber interrogator, registering the event in the local machine memory, registering the virtual sensor in a sensor network.

In another aspect, a method is featured for using information received from the fiber interrogator indicating a virtual sensor has been established, identified, dynamic addressed and registered, including the sensor type, number of sensors of the sensor type that communicate with the fiber interrogator. A unique registry name is automatically assigned to the sensor based on a name of the network access node, the sensor type, and the number of sensors of the sensor type.

In another aspect, a method is featured for querying the fiber optic span to determine if a virtual sensor is detected where the query for sensor data from the virtual sensor is received from the fiber interrogator. The query results in a classification value having a context for at least one application having access to the sensor network. A network address is determined for each of a plurality of virtual sensors associated with the classification value. Sensor data are provided to the application from each of the sensors associated with the application label.

In still another aspect, a virtual sensor registry system for management of a sensor network in a distributed system of virtual sensors is featured. The sensor registry includes registry code configured to receive sensor information received from a fiber interrogator connected to the sensor network and to automatically generate a unique sensor name in response to the sensor information. The sensor information includes a sensor type and a network address for the sensor. The sensor registry also includes a database in communication with the registry module. The database is configured to store the sensor type, the dynamically assigned network address for the sensor gateway and sensor data most recently received from the fiber interrogator.

Disclosed herein is a fiber-optic sensor system that is directed at detecting perturbations or pressure strain variation in a fiber optic cable by measuring changes in reflected laser light. In some examples, the system may process telemetry in real-time, record telemetry data for later playback and analysis, and present displays and audio output for real-time monitoring of threats and situational status. Longer lengths of sensing fiber may be used depending on parameters and sensing methods.

GLOSSARY

There are a number of terms in this document that have unique meanings in the context of this description:

CW—Continuous Wave. A continuous wave is an electromagnetic wave of constant or near constant amplitude and frequency; and in mathematical analysis, of infinite duration.

DAS—Distributed Acoustic Sensing. In DAS, the optical fiber cable becomes the sensing element and measurements are made, and in part processed, using an attached optoelectronic device. Such a system allows acoustic frequency strain signals to be detected over large distances and in harsh environments.

DTS—Distributed Temperature Sensing. DTS are optoelectronic devices which measure temperatures by means of optical fibers functioning as linear sensors. Temperatures are recorded along the optical sensor cable, thus not at points, but as a continuous profile. A high accuracy of temperature determination is achieved over great distances. Typically the DTS systems can locate the temperature to a spatial resolution of 1 m with accuracy to within ±1° C. at a resolution of 0.01° C. Measurement distances of greater than 30 km can be monitored and some specialized systems can provide even tighter spatial resolutions.

DTSS—Distributed Temperature and Strain Sensing.

MMF—Multimode Fiber. The primary difference between multimode and single mode optical fiber is that multimode has much larger core diameter, typically 50-100 micrometers; much larger than the wavelength of the light carried in it. Multimode fiber supports more than one propagation mode which limits the fiber by modal dispersion. Due to the modal dispersion, multimode fiber has higher pulse spreading rates than single mode fiber, limiting multimode fiber's information transmission capacity. Single mode fibers are most often used in high-precision sensing applications because the allowance of only one propagation mode of the light makes the light source easier to focus properly.

OTDR—Optical Time-Domain Reflectometer. An optical time-domain reflectometer is an optoelectronic instrument used to characterize an optical fiber. An OTDR is the optical equivalent of an electronic time domain reflectometer. It injects a series of optical pulses into the fiber under test. It also extracts, from the same end of the fiber, light that is scattered (Rayleigh backscatter) or reflected back from points along the fiber. The strength of the return pulses is measured and integrated as a function of time, and plotted as a function of fiber length.

PRC—Pseudo-Random Code. A sequence of reproducible random pulses, produced by a polynomial. A PRC correlates very well with itself, but very poorly when one of the signals being correlated is delayed. The use of a PRC allows one to pick out a particular transmitter when a large number of transmitters are sending the same sequence at different times.

RF—Radio Frequency. Radio frequency is a rate of oscillation in the range of around 3 kHz to 300 GHz, which corresponds to the frequency of radio waves, and the alternating currents which carry radio signals. RF usually refers to electrical rather than mechanical oscillations; however, mechanical RF systems do exist ROS—Rayleigh Optical Scattering. Rayleigh scattering is the (dominantly) elastic scattering of light or other electromagnetic radiation by particles much smaller than the wavelength of the light. The particles may be individual atoms or molecules. Rayleigh scattering results from the electric polarizability of the particles. The oscillating electric field of a light wave acts on the charges within a particle, causing them to move at the same frequency. The particle therefore becomes a small radiating dipole whose radiation can be seen as scattered light.

ROSE—Rayleigh Optical Scattering and Encoding.

Sample—The telemetry readings from one point in time. In some configurations, a sample contains 4,096 16-bit floating point numbers—one for each zone, for each polarization, for each quadrature phase. The Digital Signal Processor (DSP) refers to this as a Telemetry Processing Unit (TPU).

SMF—Single Mode Fiber. SMF is designed to carry light only directly down the fiber—the transverse mode. Modes are the possible solutions of the Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers where waves can have the same mode but different frequencies which means that they are distributed in space in the same way, and provide a single ray of light. Although the ray travels parallel to the length of the fiber, it is often called transverse mode since its electromagnetic vibrations occur perpendicular (transverse) to the length of the fiber.

P and S refer to two polarizations of the laser light and are explained further in a later section.

An understanding of three phenomena—two physical (Rayleigh backscattering and fiber stretching), and one mathematical (pseudo-random code) are helpful in understanding the present disclosure.

Rayleigh Backscattering

The laser light source is modulated by injecting a known, repeating pattern. This modulated signal is reflected back to the light origin by Rayleigh backscatter all along the fiber optic cable. Light reflected from a given point will return to the source, with a delay based on the speed of light in the fiber. Assuming the speed of light in the fiber is about 200,000,000 m/s, it will take 100 ns for the signal to travel out 10 meters and reflect back through 10 meters. If the signal is precisely correlated 100 ns after it was transmitted, it will be found within the large number of reflections coming back from the fiber length.

For purposes of explanation, the speed of light in a vacuum is known to be 299,792,458 m/s. Light in a fiber is slowed based on the refractive index of the fiber. At the 1319 nm wavelength produced by the laser, the SMF-28e fiber currently used in some example configurations has a refractive index of 1.4677. That makes the speed of light within the fiber 204,260,038 m/s. For discussion purposes, it will be rounded to 200,000,000 m/s, but in the field it is necessary to remember that this estimate is 2.13% low. When it is said that a zone is 1 meter, the physical reality is that a zone is 1.0213 m. The difference is not important for discussion, but may be important in operation. The analysis software takes this into account when displaying distances.

With the above in mind, Continuous Wave lasers have a distinct advantage over pulsed laser. Pulse modulating a CW laser is not the same as pulsed laser. It is both well understood in the art and to some extent misunderstood. Many inventions in the art of interferometry will falsely label and describe pulse modulated in an effort to traverse certain prior art related to CW. The reality is at long ranges, the best a pulsed laser will achieve is 1 kHz sampling, where CW will allow for much higher rates, e.g. 24 kHz. The following discussion describes the limitations of pulsed laser; all values approximate.

Assume a 50 km cable length and fiber optics roughly ⅓ slower; what is the maximum sampling rate achievable with a pulsed laser, anticipate round trip delay:

Light travels in a vacuum roughly $0.3 \text{ M}/1(10^{-9})$ Seconds

Assume a 50 km cable with a 100 km round trip

Since fiber is a third slower, $0.3 \text{ m}/1(10^{-9})$ Seconds*$0.67 = 0.2 \text{ m}/1(10^{-9})$ Seconds 1 light pulse will take $[100,000/0.2 \text{ m}/1(10^{-9}) \text{ Seconds}]$ or roughly $5(10^{-4})$ Seconds per pulse Dividing now 1 second/$5.0 \ (10^{-4})$ Seconds per pulse yields a max frequency of roughly 2 kHz with a Nyquist Frequency of 1 kHz.

Shorter distances obviously yield higher sampling rates

As long as the PRN code is not repeated, and coherent signals can be retrieved, sampling can be performed at much higher hates (fidelity) and much longer distances. Also, a second consideration is spatial resolution which is mainly determined by the duration of the transmitted pulse, with a 100 ns pulse giving 10 m resolution being a typical value. The amount of reflected light is proportional to the pulse length so there is a trade-off between spatial resolution and maximum range. To improve the maximum range, it would be desirable to use a longer pulse length to increase the reflected light level but this leads to a larger spatial resolution. In order for two signals to be independent, they must be obtained from two points on the fiber that is separated by at least the spatial resolution. It is possible to obtain samples at separations less than the spatial resolution and although this produces signals that are not independent of each other, such an approach does offer advantages in some applications. The separation between the sampling points is sometimes referred to as the spatial sampling period.

Fiber optic cables are not perfect. They contain a huge number of very tiny imperfections. Those imperfections reflect a small fraction of the light being transmitted through the cable. This reflected light can be measured back at the cable origin source.

In the first application of the invention, referring now to the figures, and more particularly to FIG. 1, there is illustrated the preferred embodiment for the physical method for the Fiber Stretching The cable sensitivity of fiber affects disturbances detected. Any disturbance near the cable, for instance, buried in the ground, such as footsteps, vehicles, rock falls, voices, etc., sends a small shockwave or pressure wave through the ground. Those small shockwaves disturb the fiber, causing the fiber to stretch microscopically. Those micro-stretches cause the light signal to be delayed slightly, e.g., a phase shift. This delay changes the success of the attempt to correlate the signal at precise delay points. By measuring the changes in correlation, the frequency of the disturbance that impinged on the cable can be determined. The pressure wave impact on the buried fiber optic cable can be referred to as "coupling effect," the physical mechanism of how pressure is transmitted through a medium like soil against the fiber coating. Enhancing and maximizing the coupling is a key to measuring successfully the change in the arrival and departure of light through micro-strains in the fiber optic cable.

The Rayleigh backscatter reflections are at a very low level. To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

Pseudo-Random Code

A mathematical phenomenon helps to make it possible to use standard fiber and a standard continuous wave (CW) laser. In some example configurations, the hardware generates a non-repeating pseudo-random code (PRC) sequence which is modulated onto the laser at a 100 MHz symbol rate. One aspect of the PRC sequence is that it has very important auto-correlation properties. A code will correlate extremely well with itself if it is exactly phase aligned. If it is poorly aligned, it correlates very poorly.

This is the fundamental principle behind the correlators. As an example: at 100 MHz, the PRC units are sent once each 10 ns. In 10 ns, laser light in the fiber travels approximately two meters—one meter out, and one meter back. Thus, a correlation unit can "look for" a time delayed version of the code that represents a specific section of the fiber. By correlating against the PRC sequence delayed by ten cycles, the correlation unit will get its best match to signals from ten meters down the fiber, and will tend to reject all of the other reflections.

The values used in this description serve as an example. It should be understood that other values may be used depending upon the sensing methods, equipment, system requirements, preferences, and other variables within each system. There are many parameters and sensing methods that can be used in different configurations to meet different requirements.

System Operation

The Fiber Optic Interrogator and Data Logger, depicted in FIG. 1 and referred to herein as the base configuration, comprises a highly integrated and optimized fiber optic interrogator package (integrated optics) 500, embedded controller 510, mass storage 520 of raw data and timing reference, large bandwidth Ethernet for data transfer, control panel 515 software with Ethernet link to the embedded controller 510, and fiber under test 505. In an example, all optical components are optimized in a standalone package based on a JDSU continuous wave (CW) laser. The integrated optical system 500 may include a built-in power supply 490. In some examples the integrated optics 500 may be 3D printed.

The embedded controller 510 sends operating control signals to the laser 405. The laser 405 emits light as a continuous wave (CW) or a pulse modulated signal into splitter E 410 which splits the signal into a reference signal and an interrogation signal. The reference signal is modulated by an acousto-optic modulator (AOM) 415 and the interrogation is modulated by an electro-optic modulator (EOM) 420. A portion of the modulated reference signal from the AOM 415 is transmitted to the integrated and optimized mixer subsystem 525 to splitter C 450. The remaining portion of the modulated reference signal from the AOM 415 travels to photo diodes 470 and into amplifier 475. The modulated interrogation signal from the EOM 420 travels into a circulator 430. The circulator 430 transmits the modulated interrogation signal through coupler 435 and out into the fiber under test 505. A modulated signal is back-scattered from the fiber under test 505 back through coupler 435 and into the circulator 430. The modulated signal backscattered from the fiber under test 505 travels through the circulator 430, into isolator 425, then into the signal mixer subsystem 525 at splitter A 440. The signal mixer 525 comprises a plurality of signal splitters and or signal combiners. Splitter A 440 splits the signal into combiner B 445 and combiner D 455. The modulated reference signal from the AOM 415 enters splitter C 450 which splits the signal into combiner B 445 and combiner D 455. Combiner B 445 transmits superimposed waves into photo diodes 460 and then into amplifier 465. Combiner D 455 transmits superimposed waves into photo diodes 480 and then into amplifier 485. Amplifiers 465, 475, and 485 amplify the superimposed waves and transmit them into RF links 540, 545, and 550, respectively which convert them to radio signals and transmits the resultant RF signals to the embedded controller 510.

The embedded controller 510 further transmits control information to the AOM 415 and the EOM 420 through RF generators 530 and 535, respectively. Data is transmitted back and forth between the embedded controller 510 and mass storage 520 as well as between the embedded controller 510 and the control panel 515.

In some examples the fiber under test has a coating thereon made of a thermoplastic material having the combined characteristics of a low Young's modulus and a Poisson's ratio below that of natural rubber, wherein the coating enhances the longitudinal component of strain variation derived from an acoustic wave signal. The fiber under test has a length L and the light source is a laser having the capability to generate a signal with sufficient stability to retain coherency in propagation along the fiber under test for a distance at least equal to two times the length L. The fiber under test may be single mode, multimode, or polarization preserving fiber optic cable.

Referring to FIG. 1, the base configuration further comprises a VMEbus 605. The VMEbus 605 is a non-proprietary computer bus standard that facilitates forward and backward compatibility and multi-processing (1-21 processors, or more). The VMEbus uses asynchronous daisy chain, master/slave architecture. The VMEbus, well known in the art, comprises a number of slots into which modular cards can be inserted. Each modular card adds additional functionality to the embedded controller 510.

Figure 2:
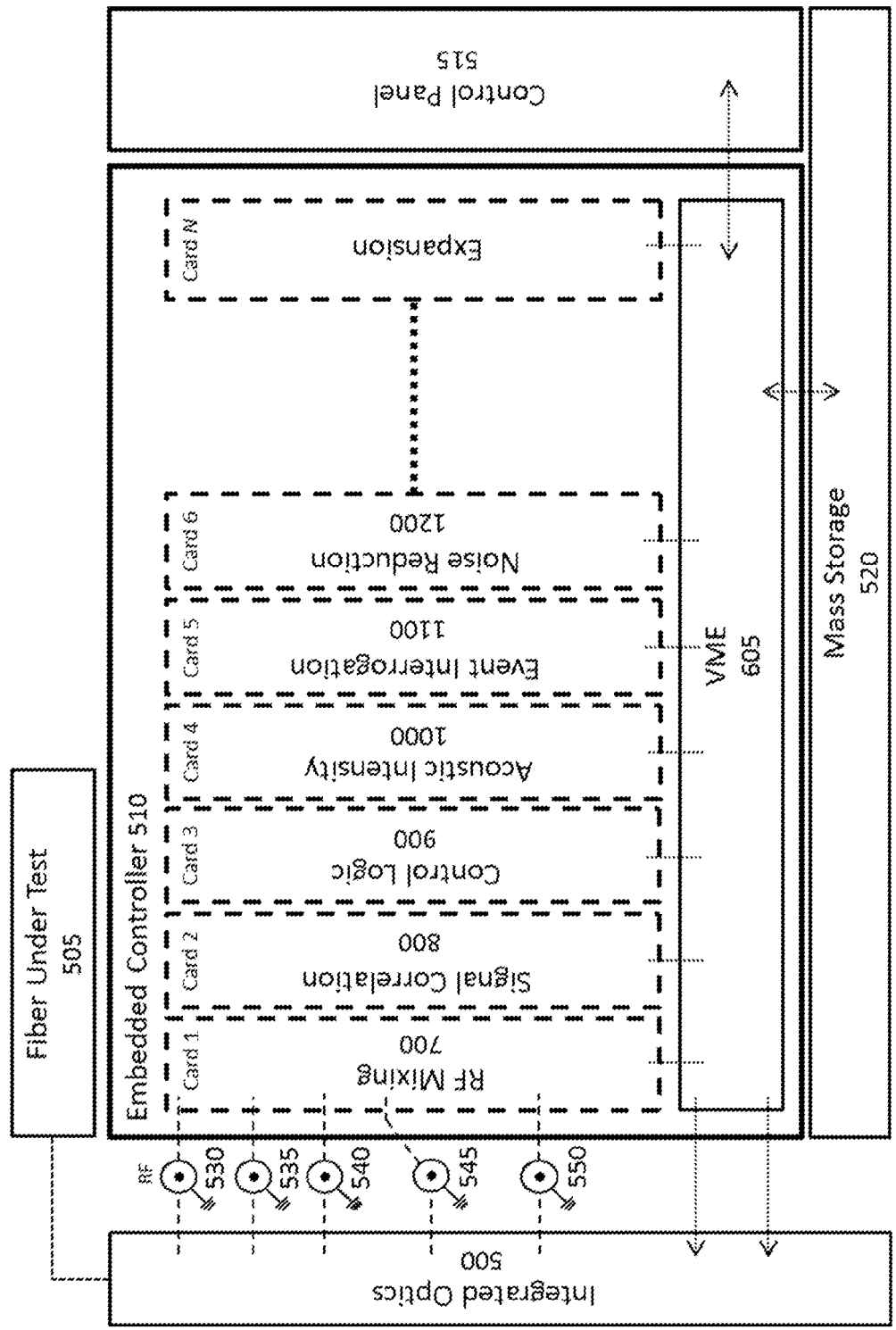
FIG. 2 depicts the base configuration of FIG. 1 equipped with an example assortment of modular cards.

FIG. 2 depicts the base configuration of FIG. 1 equipped with an example assortment of modular cards. The cards shown are radio frequency (RF) mixing 700, signal correlation 800, control logic 900, acoustic intensity 1000, event interrogation 1100, noise reduction 1200, up to card N expansions. In the depicted example the modular cards are numbered 1 to N, however, the purpose of the numbering is merely to aid in the description and does not necessarily reflect priority or order of installation.

Figure 3:
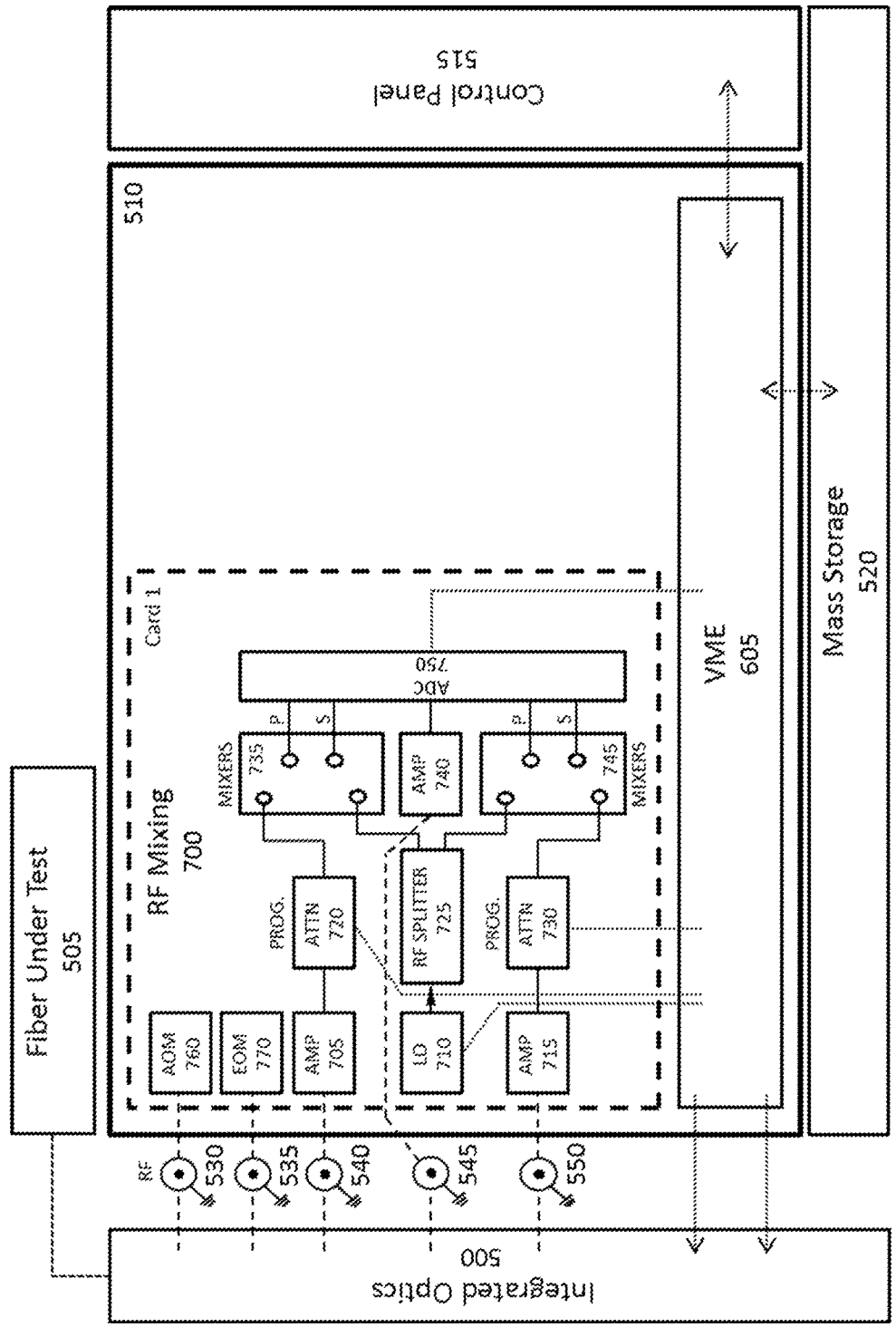
FIG. 3 depicts a first expansion card of FIG. 2—RF Mixing and Analog to Digital Conversion (ADC), referred to herein as Card 1.

FIG. 3 depicts a first expansion card of FIG. 2—RF Mixing 700 and Analog to Digital Conversion (ADC), referred to herein as Card 1. The purpose of Card 1 700 is to retrieve the RF signals from the fiber under test 505 and convert them into digital signals for further processing.

The RF signals enter Card 1 700 from RF links 530, 535, 540, 545, and 550. The RF signals from RF links 530 and 535 transmit data from the AOM RF generator 760 and the EOM RF generator 770, respectively. The RF signal from RF link 545 is the power feedback for laser control. It is amplified through amplifier 740 and passed to ADC 750. Local oscillator 710 outputs a signal that is split by RF splitter 725 and relayed into mixers 735 and 745. In an example, the local oscillator 710 outputs a 900 MHz signal added to a 10 Hz beat frequency. The RF signal from RF link 540 is amplified by amplifier 705, attenuated by attenuator 720, and relayed to mixer 735 where it is mixed with a portion of the signal from local oscillator 710. The signal from RF link 550 is amplified by amplifier 715 attenuated by attenuator 730 and relayed to mixer 745 where it is mixed with a portion of the signal from local oscillator 710.

The mixers 735 and 745 output P and S signals to the ADC 750. The resulting digital signal is sent from Card 1 700 to VME 605 and further forwarded to mass storage 520 and control panel 515. Further information is passed to the VME 605 from the local oscillator 710 and the attenuators 720 and 730.

Figure 4:
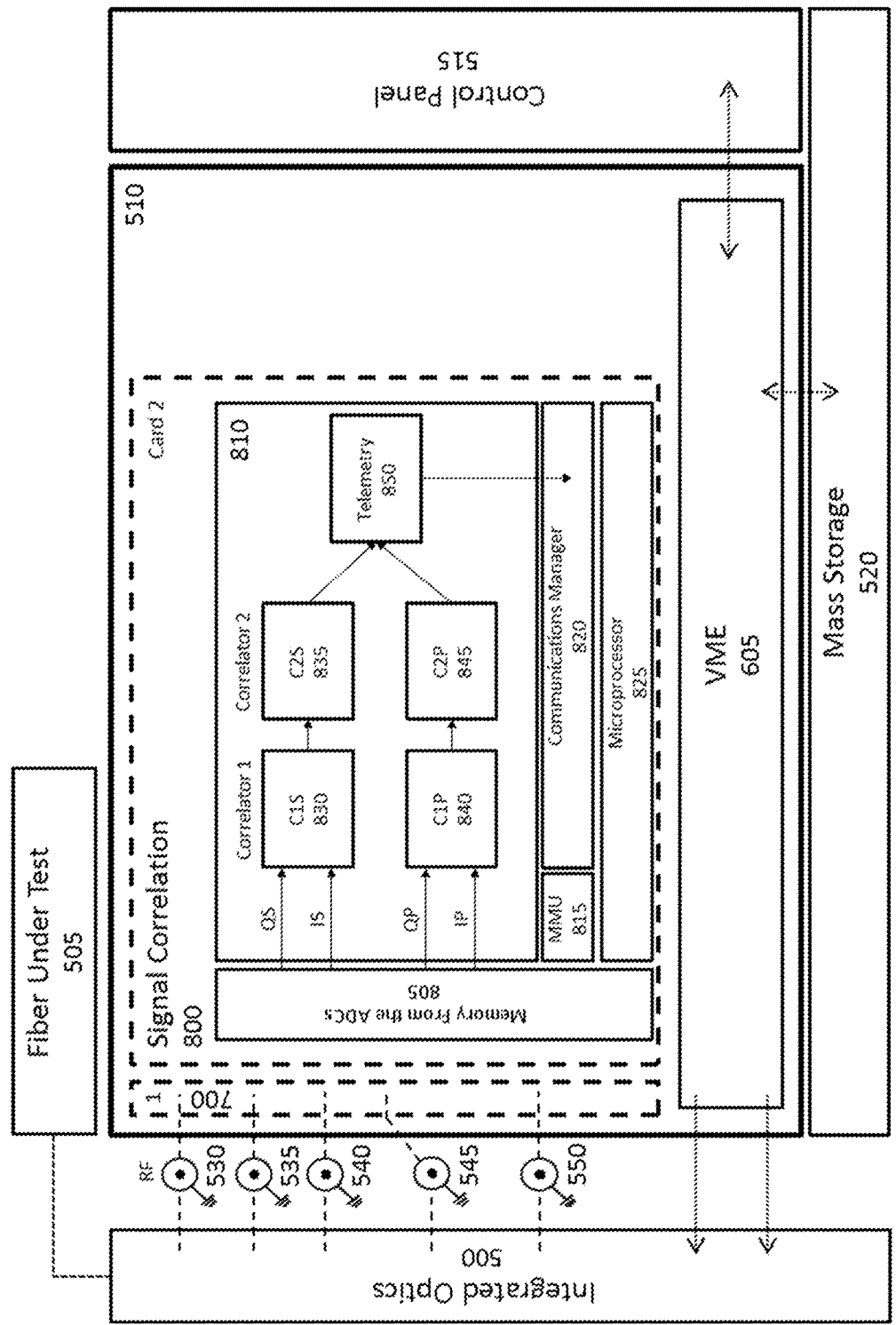
FIG. 4 depicts a second expansion card of FIG. 2—Signal Correlation, referred to herein as Card 2.

FIG. 4 depicts a second expansion card of FIG. 2—Signal Correlation 800, referred to herein as Card 2. Card 2 800 uses a digital signal processor (DSP) to take the converted signals from Card 1 700 and correlate them into telemetry information.

To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

The converted signal data is retrieved from memory 805 and passed into the correlator system 810. The in-phase and quadrature phase S signals (IS and QS) are correlated in a first correlator, C1S, 830 and transmitted to a second correlator, C2S, 835 then to telemetry 850. The in-phase and quadrature phase P signals (IP and QP) are correlated in a first correlator, C1P, 840 and transmitted to a second correlator, C2P, 845 then to telemetry 850. The telemetry information is then transmitted to a communications manager 820. Card 2 800 may also include a microprocessor 825 and a memory management unit (MMU) 815.

Figure 5:
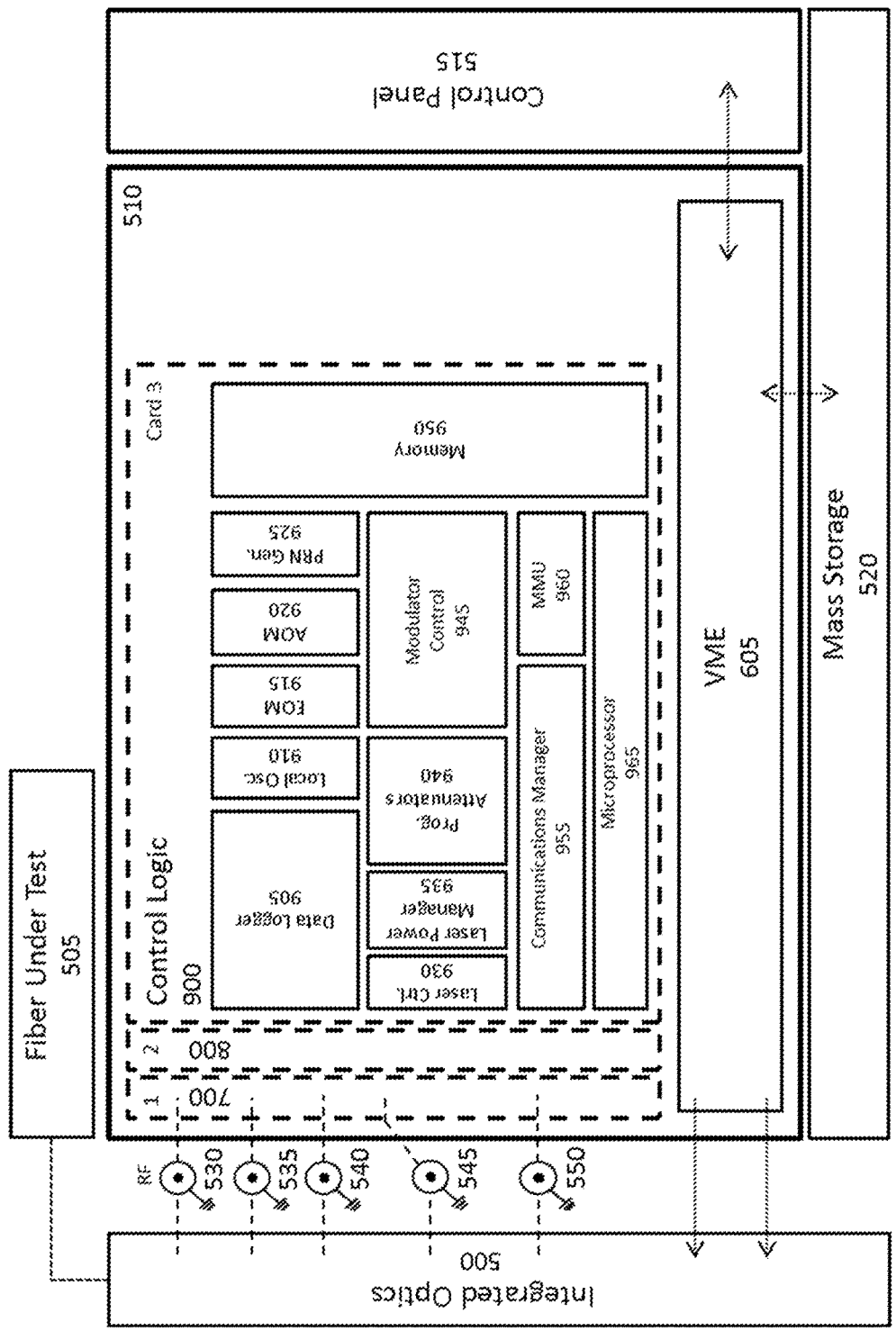
FIG. 5 depicts a third expansion card of FIG. 2—Control Logic and Data Logger, referred to herein as Card 3.

FIG. 5 depicts a third expansion card of FIG. 2—Control Logic 900 and Data Logger, referred to herein as Card 3. Card 3 900 provides control logic to the system components. Card 3 900 comprises data logging logic 905, local oscillator (LO) control 910, EOM control 915, AOM control 920, pseudo-random noise (PRN) generator 925, laser control 930, laser power manager 935, programmable attenuators 940, modulator control 945, memory 950, communications manager 955, MMU 960, and microprocessor 965.

The data logger 905 provides the data logging logic including timestamps and multiplexing multiple signals IQ, IP, SQ, and SP (described further in FIGS. 6 and 7), into one signal and stores the information in binary. The local oscillator (LO) 910, EOM 915, and AOM 920 control logic provides control data to the corresponding hardware components. The pseudo-random noise (PRN) generator 925 provides a PRN code to the AOM. Laser control 930 and laser power manager 935 are used to monitor and control the laser. Programmable attenuator 940 and modulator 945 control the corresponding hardware components. The memory 950 is flash memory. Data is stored in mass storage 520.

Cards 1 through 3 700, 800, and 900 are required for basic data logging purposes. Additional cards are required to process and classify the logged data. Cards 1 through 3 700, 800, and 900 are not integrated into the base system. Allowing them to be modular allows for scaling processing capabilities to project-specific requirements, simple system upgrades, and rapid reconfiguration.

Figure 6:
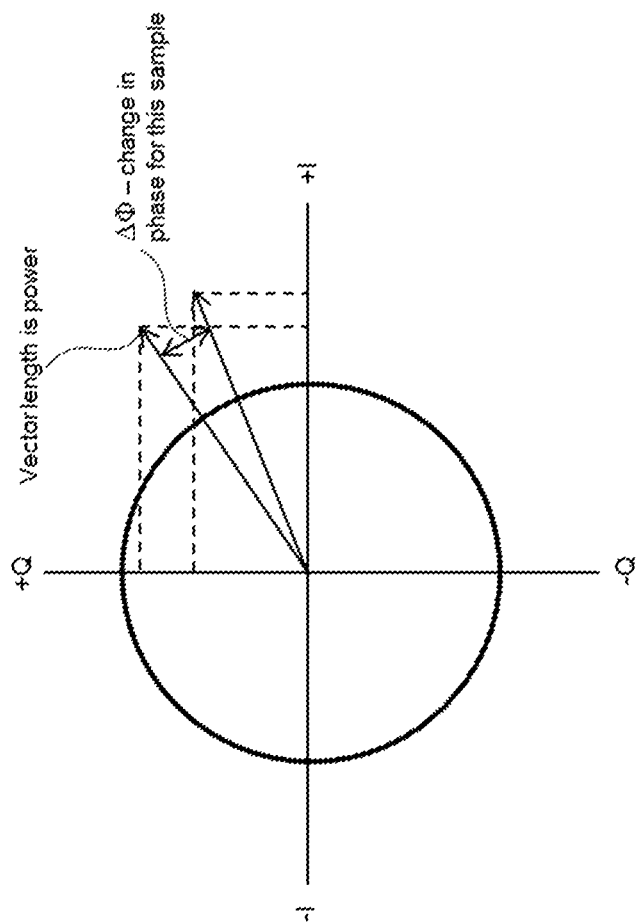
FIG. 6 is a graphical depiction of polarization.

The beat signal produced by the demodulation causes the phase of the vector to rotate through 360 degrees. In an ideal system with no impetus, the vector length would remain constant, describing a circle, as depicted in FIG. 6. This attribute is used to normalize the signal processing. Depending on the optional cards installed, this data may be monitored on the user interface in the form of Lissajou curves. Assigning the phase data to Cartesian coordinates with the in-phase (I) value as the x-axis and the quadrature phase (Q) value as the y-axis allows for conversion of each correlation value to a vector using an arctangent. The change in the angle of that vector ($\Delta\Phi$) from sample to sample yields the relative change in correlation strength, phase, for that particular zone. The result is the audio reading for the sample. The length of the vector indicates the power for the sample. Generally, the algorithms depicted in FIG. 6 are known in the art and are included as illustrative examples.

Figure 7:
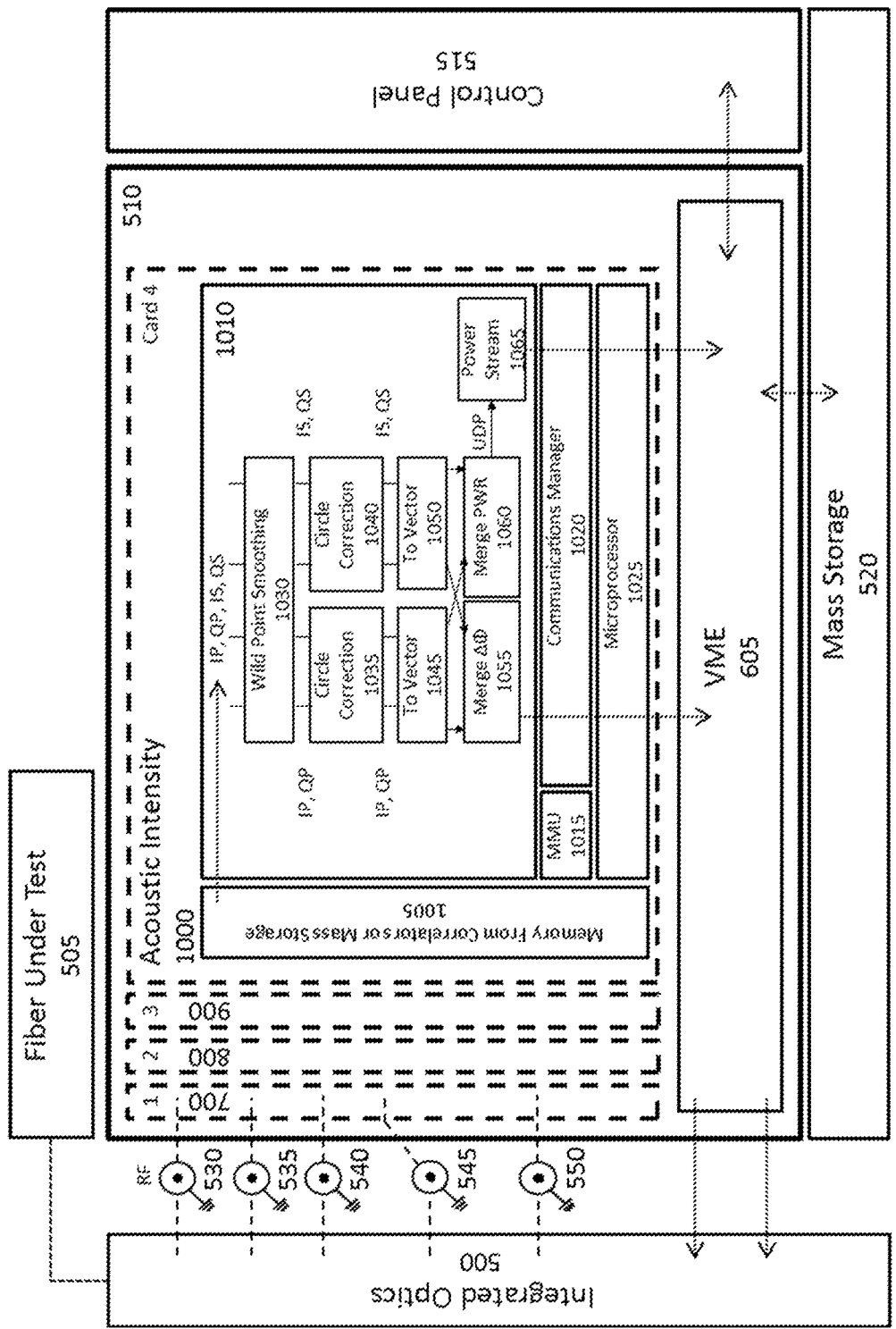
FIG. 7 depicts a fourth expansion card of FIG. 2—Acoustic Intensity, referred to herein as Card 4.

FIG. 7 depicts a fourth expansion card of FIG. 2—Acoustic Intensity 1000, referred to herein as Card 4. The purpose of Card 4 1000 is to manage acoustic event intensity.

Telemetry data is retrieved from memory 1005 from one of the correlators or mass storage 520. The telemetry data, IP, QP, IS, and QS (where IP and QP represent quadrature data, 90° out of phase, for the "parallel" polarization from the fiber and IS and QS represent quadrature data for the "perpendicular" polarization), is passed through wild point smoothing 1030 to eliminate noise and fill in missing values, providing a cleaner output signal.

Once the signal has been smoothed, the P signal data and the S signal data proceed through separate circle corrections 1035 and 1040, respectively and then to vector 1045 and 1050, respectively. Change in phase ($\Delta\Phi$) data 1055 and power data 1060 is then merged from information obtained from both vectors 1045 and 1050. The resulting power and $\Delta\Phi$ data are the basis for the remainder of the signal processing. Change in phase data ($\Delta\Phi$) 1055 is transmitted to the VME 605.

Power data 1060 is transmitted via user datagram protocol (UDP) packet to power stream 1065 and finally to VME 605. Card 4 1000 may also include a microprocessor 1025, communications manager 1020, and a memory management unit (MMU) 1015.

Figure 8:
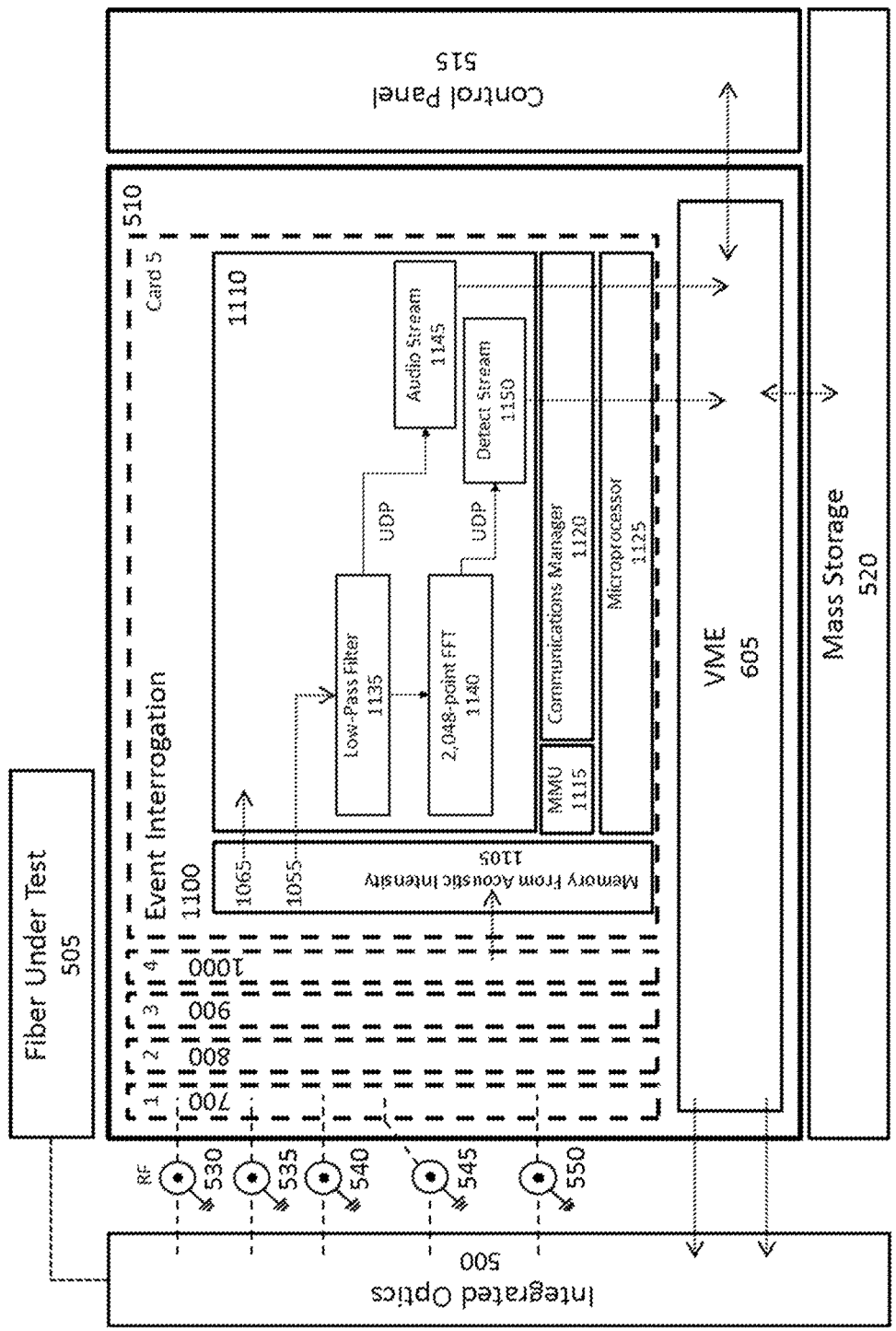
FIG. 8 depicts a fifth expansion card of FIG. 2—Event Interrogation and Demodulation, referred to herein as Card 5.

FIG. 8 depicts a fifth expansion card of FIG. 2—Event Interrogation 1100 and Demodulation, referred to herein as Card 5. Card 5 1100 provides additional functionality to Card 4 1000.

Change in phase data ($\Delta\Phi$) 1055 is retrieved from memory 1105 from one of Card 4 1000 or from mass storage 520. The $\Delta\Phi$ values from the two polarizations are combined in proportion to the power readings. The resulting power and $\Delta\Phi$ are the basis for the remainder of the DSP processing, which produces a series of products on various UDP ports, for consumption by other applications. The change in phase data ($\Delta\Phi$) 1055 is passed through low-pass filter 1135 to attenuate noise. In an example, the low-pass filter 1135 attenuates outside the range of 18 Hz to 300 Hz. The filtered signal is sent via UDP packet to the audio stream 1145.

A Fast Fourier Transform (FFT) 1140 is then performed on the change in phase ($\Delta\Phi$) 1055 values. The power spectrum of the FFT 1140 is computed and the standard deviation of the power spectrum is compared to the average power spectrum over time. The standard deviation becomes the detector data stream and can be used by other data analysis software as a first-order estimate of the level of activity in the corresponding zone. By monitoring the values over time and comparing the values to adjacent zones, analysis software can get a first indication that an event has occurred. Card 5 1100 merely indicates that an event has occurred—additional cards are necessary to process and classify the event. In an example, the FFT 1140 is run on 2,048 points. This number of points processed by the FFT 1140 limits resolution for feature discrimination in the detector stream. From the FFT 1140 the signal data is passed via UDP packet to the detect stream 1150. The resulting information is passed from the audio stream 1145 and the detect stream 1150 to the VME 605. Card 5 1100 may also include a microprocessor 1125, communications manager 1120, and a memory management unit (MMU) 1115.

Audio data are produced by subtracting the $\Delta\Phi$ values for any two zones. When the fiber stretches, the light is delayed from that point all the way down the fiber. Thus, the audio reading for the zones at the end of the fiber includes all of the stimuli that occurred on the entire length of the fiber. By subtracting the zone X value from the zone Y value, one gets only the stimuli that occurred between zone X and zone Y. In an example, audio streams can be produced for two or more zone pairs at a time.

Figure 9:
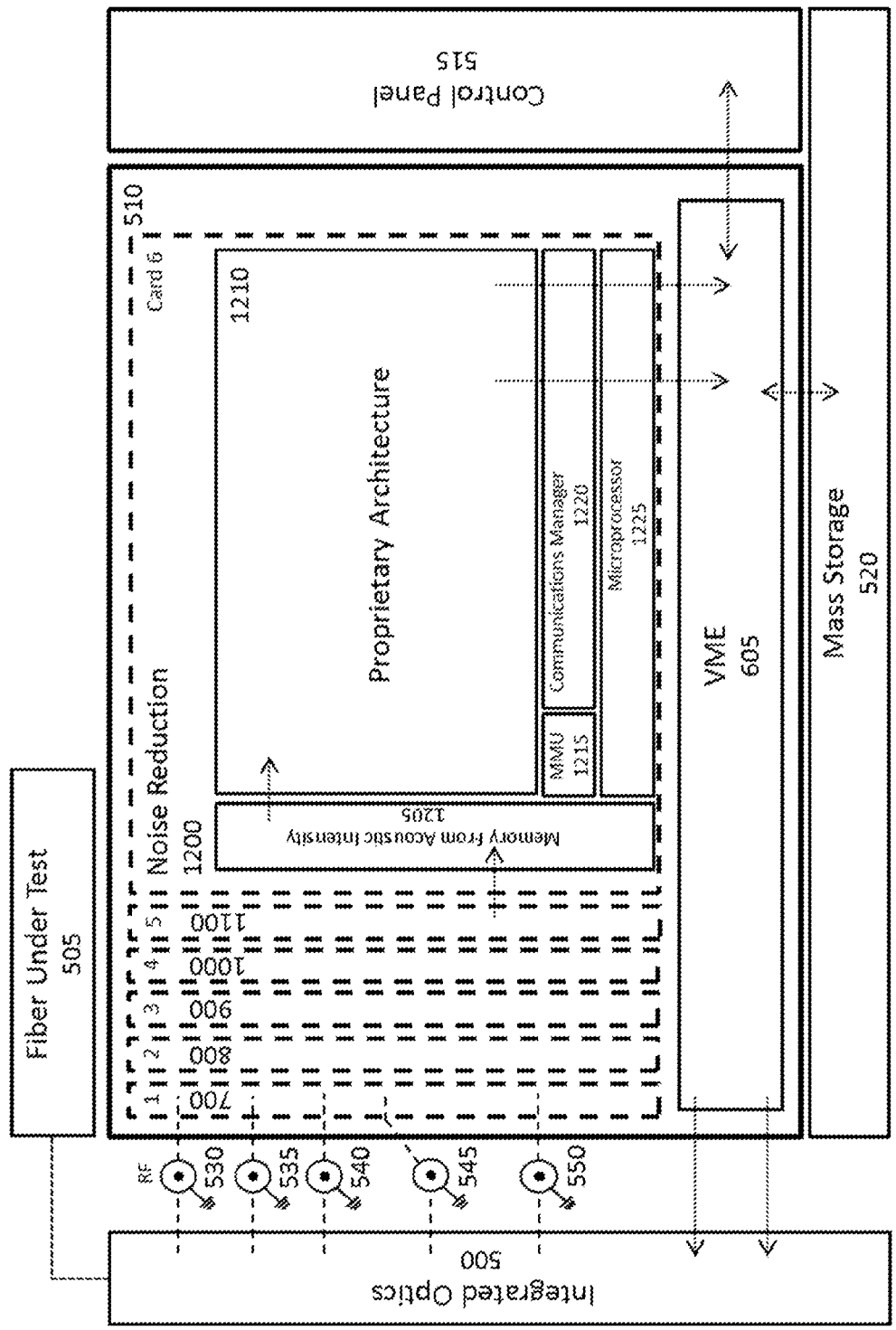
FIG. 9 depicts a sixth expansion card of FIG. 2—Noise Reduction and Classification, referred to herein as Card 6.

FIG. 9 depicts a sixth expansion card of FIG. 2—Noise Reduction 1200 and Classification, referred to herein as Card 6. The purpose of Card 6 1200 is to reduce signal noise to provide cleaner signal output. Cleaner signal output allows for more accurate classification of events. The signal is passed to Card 6 1200 from memory 1205 from one of Card 5 1100 and mass storage 520 to noise reduction architecture 1210 where it is processed and passed to the VME 605. Card 6 1200 may also include a microprocessor 1225, communications manager 1220, and a memory management unit (MMU) 1215.

An interrogation light wave source may be generated by modulating the amplitude, phase, or polarization of a coherent light wave with a time-structured correlation code. The correlation code can be a series of pulses, chirps, binary sequences, or any other type of code which provides the required correlation characteristics. Therefore, delaying the correlation decoding/de-multiplexing function allows de-multiplexing of delay multiplexed signals identifiable by speed of propagation and distance of flyback travel.

Classification

Referring back to FIGS. 1 through 4, the integrated fiber optic interrogator 500 is separated into an interface by digital or analog links. In an example, the input to the embedded controller 510 is a digital signal generated by the outputs of the photodiodes 460, 470, and 480, these are received on one of more RF links 540, 545, and 550 at an ADC 750, and the output of the ADC 750 is an 800 Mbps telemetry stream 850. The stream 850 consists of UDP packets, where each packet consists of 1,024 correlator count readings for each of the four polarization/phase combinations (IP, QP, IS, QS. Where IP and QP represent quadrature data, 90° out of phase, for the "parallel" polarization from the fiber and IS and QS represent quadrature data for the "perpendicular" polarization). The values produced by the hardware correlators 810 are 28-bit integers, but the individual readings are represented in telemetry 850 in 16-bit IEEE half-precision floating point. This format gives 10 bits of precision with a wide dynamic range, and suits the correlator data very well.

The embedded controller 510 in the example has the ability to record the raw telemetry data (raw binary) directly to disk, before any filtering or post-processing is done. This is a critically important function because it allows the stream to be replayed at a later time, producing exactly the same results as if the stream were being read in real-time. This allows for a wide variety of experimentation in advanced signal processing and classification needs. The mass storage system 520 in the embedded controller 510 computer must be chosen and configured carefully in order to handle a continuous output of 100 MB/s, while still handling all of the data processing and display requirements of the embedded controller 510.

It should be mentioned that a particularly suitable application for example configurations would include any remote vibration sensing application for which the range to the disturbance would be sufficiently long as to pose laser phase stability problems with respect to the micro-Doppler signal recovery process. A significant subset of the above-mentioned application is in remote sensing of disturbance vibrations for applications such as non-cooperative disturbance classification or intelligence gathering in situations under which the laser phase noise of the master oscillator effectively masks the signal of the disturbance, i.e., a disturbance located at a range R beyond the coherence length $l_c$ of the MO in the transmitter. It will be appreciated that micro-Doppler optical fiber sensing systems can be used to measure the vibrational spectrum of bridges, buildings, pipelines, pumps, taxiing aircraft, volcanoes, etc.; the vibration spectrum obtained can reveal the mechanical health of machinery and structures for a variety of purposes.

The transmission of telemetry 850 as broadcast UDP packets on a standard Ethernet fiber makes it possible to connect other cards to the local telemetry network and have other applications consume the telemetry data for special purpose analysis. Many other applications are possible including, as an example, a variety of advanced signal processing algorithms or classification schemes to meet a variety of customer requirements.

In an example, the input to the embedded controller 510 is the telemetry data stream 850 on UDP port 5001 coming out of the hardware. The data stream consists of blocks 64,800 bytes long, which arrive 612 times per second. Each block, referred to in the source as a "gram", consists of twenty samples, called a telemetry processing unit (TPU). Each TPU contains four sets of 200 or 400 values, one set for the IP, IS, QP, and QS correlator cells, plus min/max/average data, and a sequence number that increments once per gram. IP and QP represent quadrature data, 90 degrees out of phase, for the "parallel" polarization from the fiber. IS and QS represent quadrature data for the "perpendicular" polarization.

There are other tools in the collection that have very specific uses. When first starting to make classifications only the regions of each audio file that were of interest for training were extracted. An analyst would listen to the recorded audio files and identify areas of interest using an audio analysis application and then extract those areas into individual WAV files. What is needed for the raw data to be processed for use is the original AUD data. To achieve this, a tool, which will be called WaveMatcher Tool for purposes of this disclosure, would compare each extracted audio snippet against the larger WAV file, find the matching section, and write a file of directives identifying where the snippet came from. Another tool, which will be called ExtractAudSection Tool for purposes of this disclosure, would then use that file of directives to extract the corresponding pieces from the original AUD file.

Subnetting

Computers that belong to a subnet are addressed with a common, identical, most-significant bit-group in their IP address. This results in the logical division of an IP address into two fields, a network or routing prefix and the rest field or host identifier. The rest field is an identifier for a specific host or network interface.

The routing prefix is expressed in Classless Inter Domain Routing or more commonly referred to as CIDR notation. It is written as the first address of a network, followed by a slash character (/), and ending with the bit-length of the prefix. For example, 1.1.1.0/24 is the prefix of the Internet Protocol Version 4 network starting at the given address, having 24 bits allocated for the network prefix, and the remaining 8 bits reserved for host addressing. The IPv6 address specification 2001:db8::/32 is a large address block with $2^{96}$ addresses, having a 32-bit routing prefix. For IPv4, a network is also characterized by its subnet mask, which is the bitmask that when applied by a bitwise AND operation to any IP address in the network, this yields the routing prefix. Subnet masks are also expressed in dot-decimal notation like an address. For example, 255.255.255.0 is the network mask for the 1.1.1.0/24 prefix.

Figure 10:
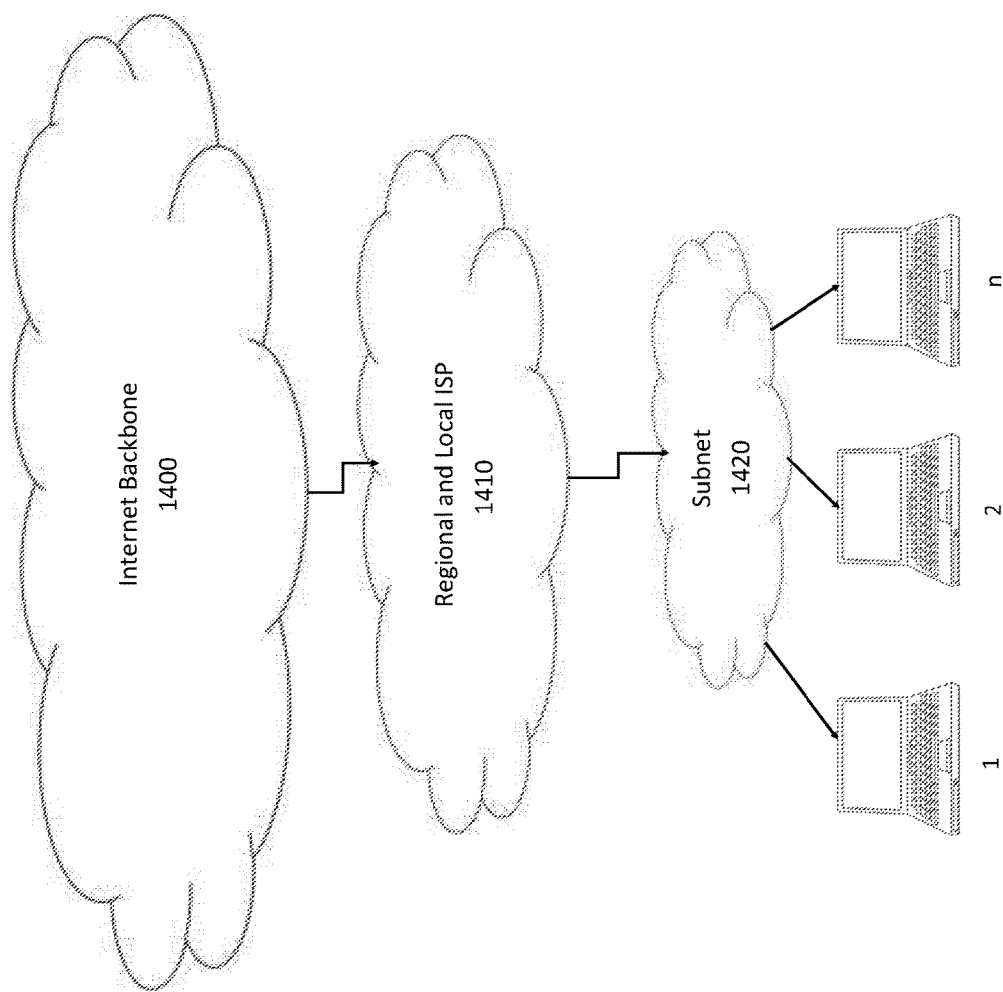
FIG. 10 generally depicts the typical network topology of the internet today comprised of networks and network layers.

FIG. 10 generally depicts the typical network topology of the internet today comprised of networks and network layers. At the higher levels, the Internet "backbone" 1400 is typically not available to a user directly; instead the user operates in a subnetwork, or subnet 1420. The backbone 1400 typically comprises national internet service providers (NSPs) which are interconnected by network access points (NAPs), internet exchange points (IXPs), or metropolitan area exchanges (MAEs). This layer of the network topology typically does not store information; only transmits it, as does the next layer. The next layer down in the topology comprises carrier-operated regional and local internet service providers (ISPs) 1410. End users such as commercial and residential individuals then connect to ISPs 1410 from a subnet 1420. IPv4 addressing assigns a network address to each device and can divide addresses into subnets.

FIG. 10 also depicts generally how traffic is exchanged (routed) from the backbone 1400 to regional and local ISPs 1410. The ISPs 1410 use the same scheme when communicating and routing down to a local subnet 1420. The ISPs use special gateways (routers) with dedicated addresses for each subnet 1420 because the routing prefixes of the source address and the destination address differ. A router constitutes the logical or physical boundary between the subnets.

The benefits of subnetting an existing network vary with each deployment scenario. In the address allocation architecture of the internet using CIDR and in large organizations, it is necessary to allocate address space efficiently. It may also enhance routing efficiency or have advantages in network management when subnetworks are administratively controlled by different entities in a larger organization. Subnets may be arranged logically in a hierarchical architecture, partitioning an organization's network address space into a tree-like routing structure.

Computing in the FOG

Today, the question being debated—are the "things" in the Internet of Things (IoT) really each going to need a traditional IP address? The short answer is likely yes because in the things in the IoT the roles are essentially reversed, things connected to the cloud are now mostly server devices with IP to IP connectivity. Because of network address translation a unique-to-the-world IP address is not typically needed; many machines in a subnet can and do have the same address. But now consider thermostats, sensors around the home and business, appliances, and wearable computing—there are some that will say no. Cisco has proposed a new concept called "Fog computing". This approach allows for a near in device connected to a sensor array to operate as a subnet within the cloud but close to the edge; close enough to have dedicated connectivity, IP to IP or Machine to Machine (M2M); this approach looks more like a more traditional distributed computing model but operates as a distributed edge computing model where some M2M computation and storage takes place locally on the edge of the Fog. This could be a home or a car and, when necessary, there is periodic communication with the cloud. This allows the network of devices that interact in the home or the car to do so without connectivity to the internet. The Fog acts as a gateway to the cloud. In this example, more intelligent devices may have traditional IP addresses while feeder devices may not.

Figure 11:
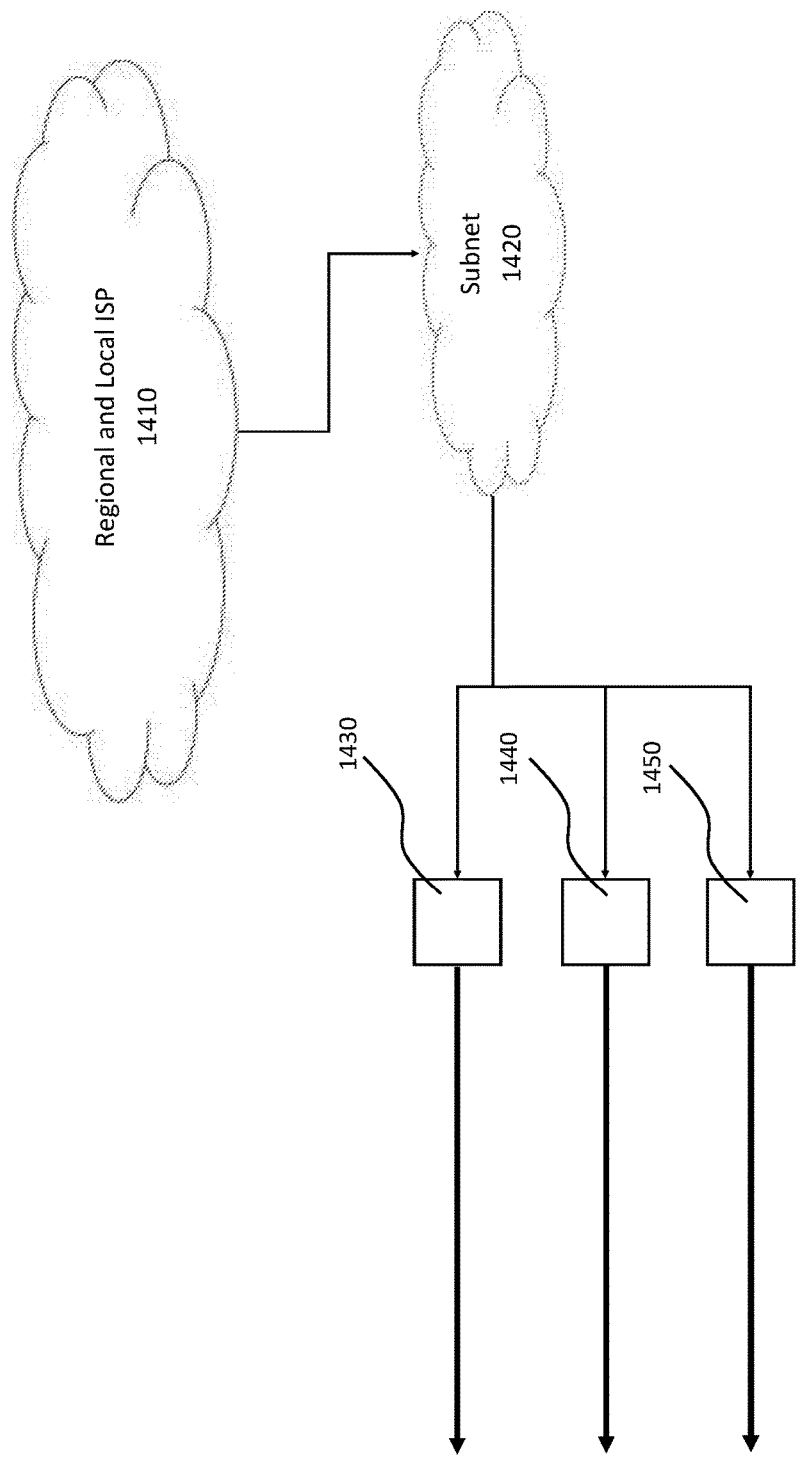
FIG. 11 depicts three different fiber optic interrogators (FOIs) in a traditional network topology with fixed IP addresses and designated sensors.

FIG. 11 depicts three different fiber optic interrogators (FOIs) 1430, 1440, and 1450 in a traditional network topology with fixed IP addresses and designated sensors. This is how fiber optic sensor systems currently operate. A first FOI 1430 may be acoustic, a second FOI 1440 may be mechanical, and a third FOI 1450 may be thermal. Each FOI 1430, 1440, and 1450 generates sensor reports that are centralized, sorted, stored locally, and/or sent to the subnet 1420 and ultimately out to the cloud through local ISP 1410. In the depicted embodiment each FOI 1430, 1440, and 1450 may have a fixed IP address and all of the sensors may be assigned a designated number. It is the responsibility of each FOI 1430, 1440, and 1450 to interrogate the information and store it or transmit it to a specified location.

Figure 12:
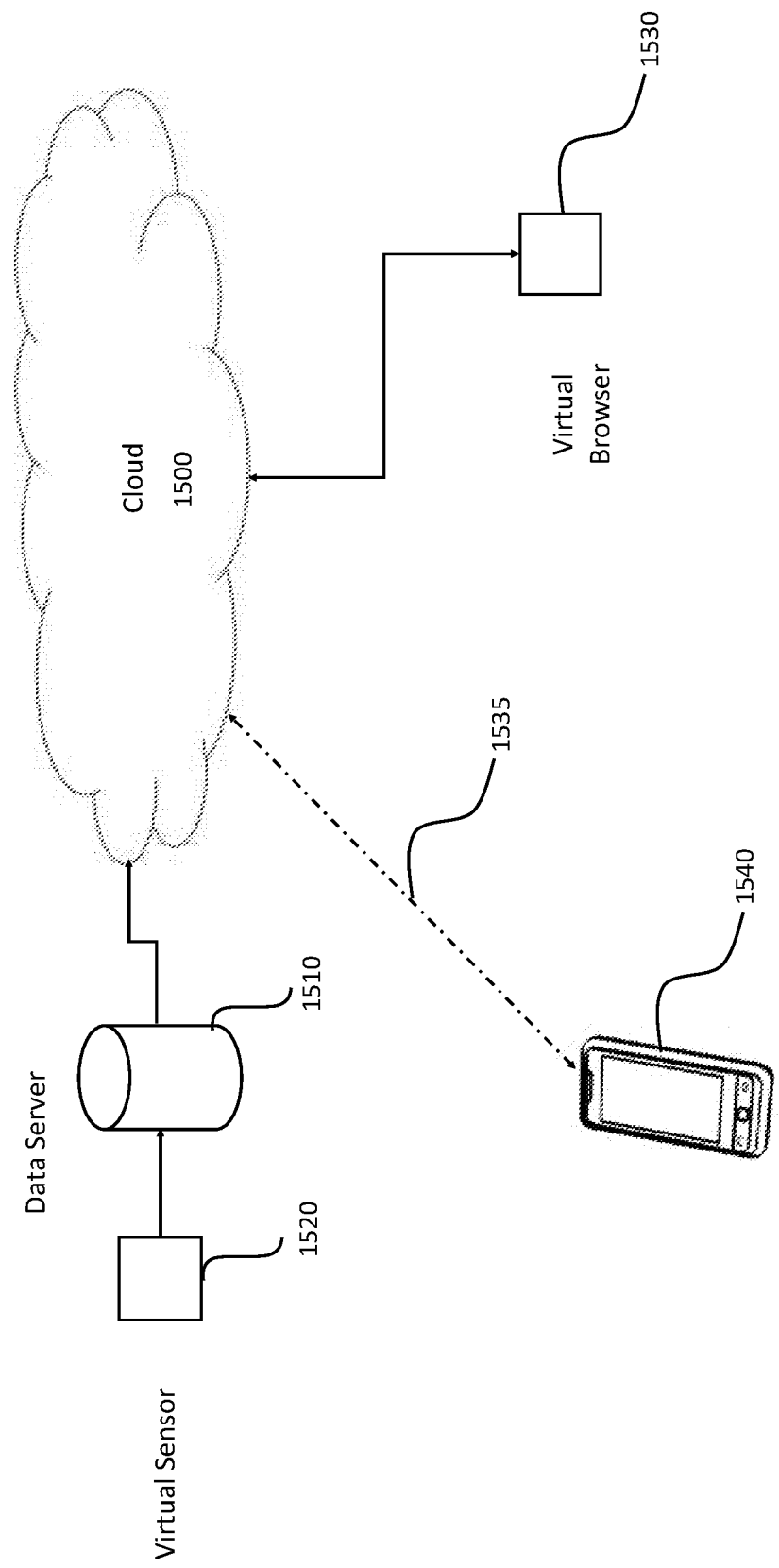
FIG. 12 depicts how networking technology has developed and evolved into forms that can bypass or reverse the roles of traditional network topology.

FIG. 12 depicts how networking technology has developed and evolved into forms that can bypass or reverse the roles of traditional network topology. This figure depicts a bottom up topology. In the figure a smartphone 1540 communicates 1535 with the cloud 1500. Data may be transmitted from a virtual sensor 1520 to a server 1510. The sensor data may reside in the server 1510 until it is requested by a user through a virtual browser 1530 which may be running on a remote device such as smartphone 1540. Alternatively, the data from the virtual sensor 1520 may be stored in the cloud 1500. Because the sensor data is either stored in or accessible through the cloud 1500 it may be accessed remotely from anywhere in the world.

A real-world example of FIG. 12 is the architecture of NEST™ Labs thermostats. Even though NEST™ products can be accessed by the internet, they cannot be directly connected to by a smart device for the control and operation of a home heating system. In order for the user to access his or her home thermostat, the user needs to access their page on the NEST™ Services server. However, the traditional role of web server and browser has been expanded under the new HTML 5 standard. There has been what looks like a role reversal of the server and browser, one where the web server is now the smart thermostat; this server is simply serving small amounts of data to a fixed URL in the cloud running a browser. This browser in the cloud can be accessed by a user using a smart device or computer from virtually anywhere to read or interact with their thermostat. Using the web server in this role is now a key and underlying concept of the IoT, one where complexity and cost are greatly reduced.

In another embodiment of FIG. 12 the device connected to the cloud 1510 is a data server and configured to gather data from virtual sensors 1520 and the data is both disparate and targeted for different applications. Now add to this a geographic diversity where fiber optic Distributed Acoustic Sensing (DAS) systems 1550 and 1560 can be configured to monitor for intrusion detection for perimeter security 1551, mechanical activity 1552 from mechanical strain, thermal activity 1553 from fire or heat, all from a single optical fiber. It would be advantageous to use certain data from multiple networks in a unified way. One possibility is addressing these events in a like way. In short, abstracting the event to the dynamics of the event, and create a data driven address based on the event. To complicate this further, assume the sensors do not exist until there is an event.

Figure 13:
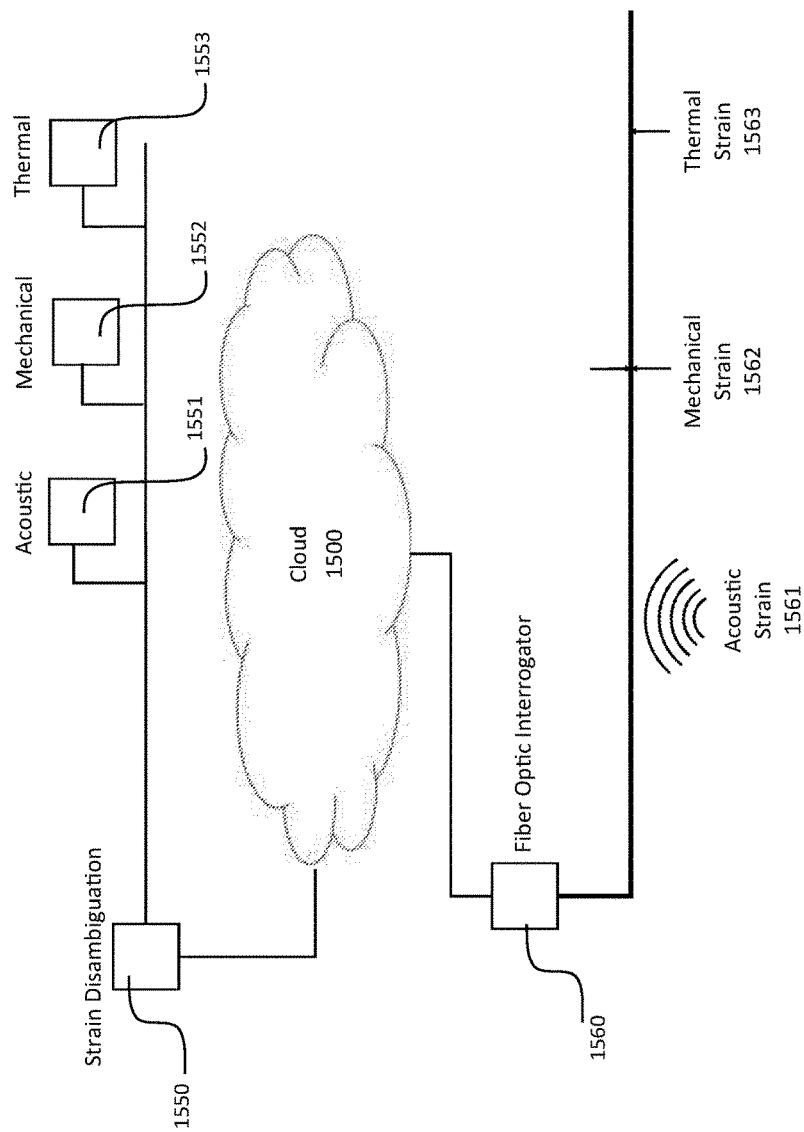
FIG. 13 depicts a fiber optic interrogator (FOI) with a virtual network.

FIG. 13 depicts a fiber optic interrogator (FOI) 1560 with its virtual network. In the depicted architecture a single FOI 1560 can be programmed to identify all strain types including acoustic 1561, mechanical 1562, and thermal 1563. The FOI 1560 can qualify each event in terms of distance and type based on time of observation. The FOI 1560 can generate a unique address for each that is broadcast to a static server in the cloud 1500. The information may be transmitted from the cloud 1500 through a strain disambiguation engine 1550 which may distribute it to different appropriate applications based on the address of the event received. The applications may comprise acoustic strain 1551, mechanical strain 1552, and thermal strain 1553. How the events may be addressed is described in further detail below.

Figure 14:
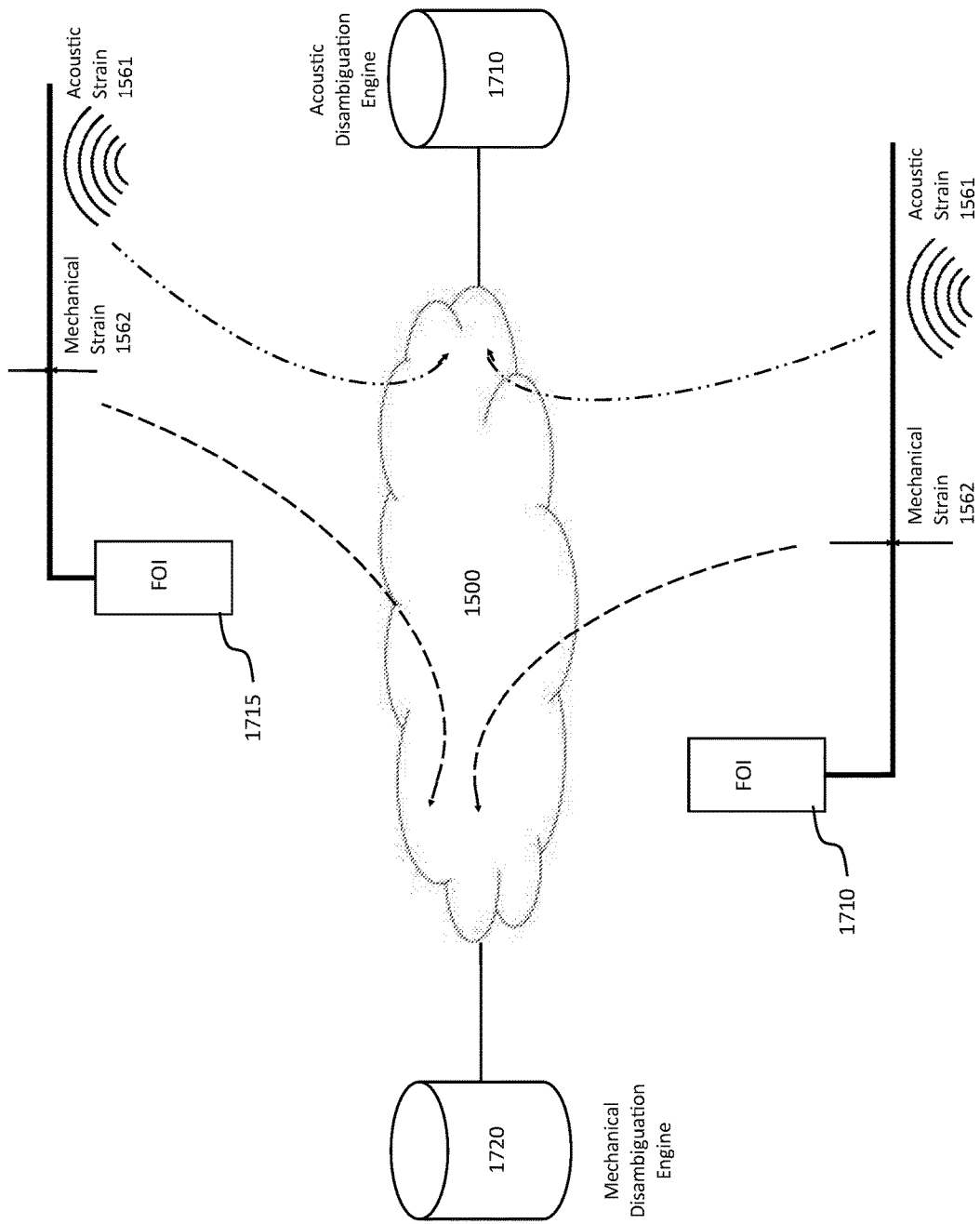
FIG. 14 depicts a fully mature sensing system based on a dynamic addressing scheme from virtual sensors and routed directly with unique addressing to servers and applications that can interpret the data.

FIG. 14 depicts a fully mature sensing system based on a dynamic addressing scheme from virtual sensors and routed directly with unique addressing to servers and applications that can interpret the data. Any FOI becomes simply an interrogation and addressing box. Mechanical strains 1562 from FOI 1715 and from FOI 1710 are qualified and dynamically shipped, addressed, and broadcast to the cloud 1500. Those messages are received by a mechanical disambiguation engine 1720. Acoustic strains 1561 from FOI 1715 and from FOI 1710 are qualified and dynamically shipped, addressed, and broadcast to the cloud 1500. Those messages are received by an acoustic disambiguation engine 1710.

Figure 15:
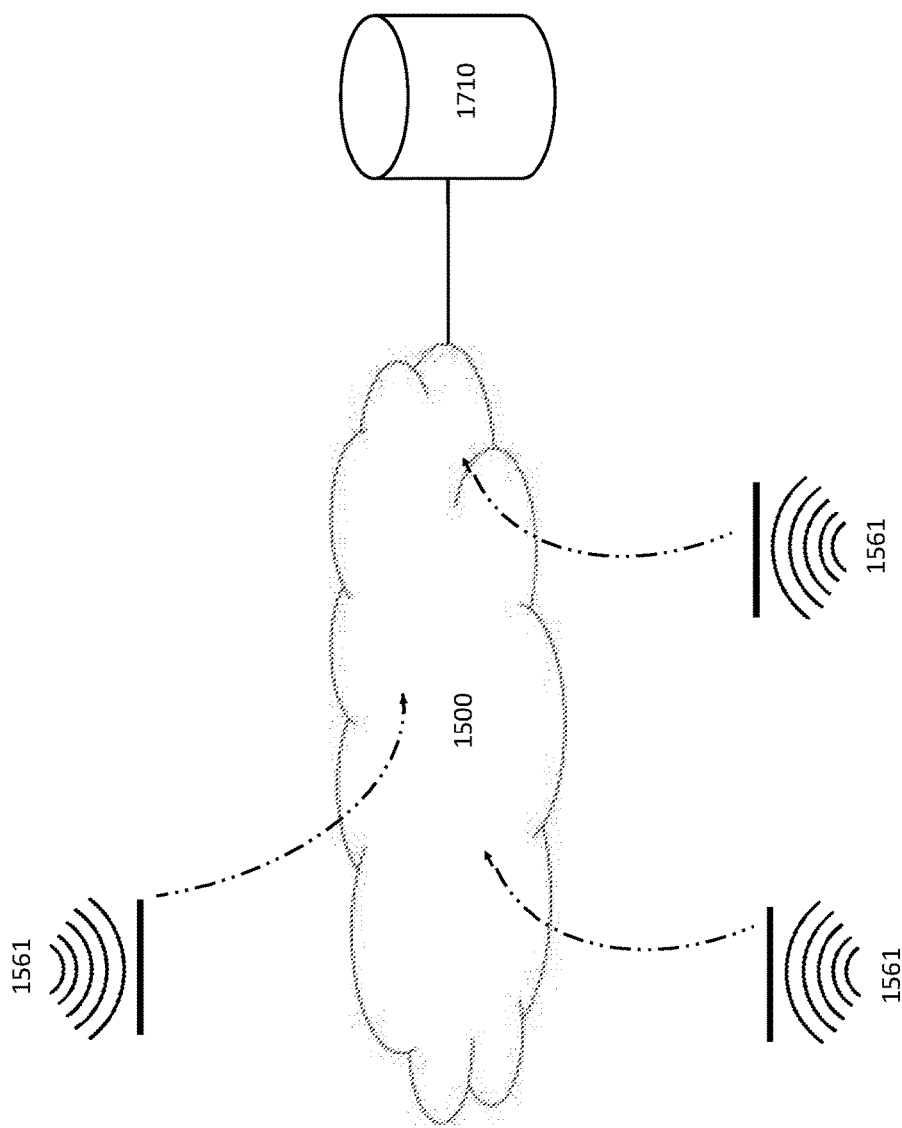
FIG. 15 generally depicts a number of acoustic strains that can be addressed and transmitted to the cloud and acoustic disambiguation engine from anywhere.

FIG. 15 generally depicts a number of acoustic strains 1561 that can be addressed and transmitted to the cloud 1500 and acoustic disambiguation engine 1710 from anywhere. Now the fiber optic sensors are virtual sensors that can be read anywhere in the world.

MAC Addressing

As background, MAC addresses typically are represented as 48 bits in length; today some types of networks require 64-bit addresses instead. As an example, ZigBee wireless home automation and other similar networks are based on IEEE 802.15.4 which requires a 64-bit MAC address to be configured on their hardware devices.

TCP/IP networks based on IPv6 also implement a different approach to communicating MAC addresses compared to mainstream IPv4. Instead of 64-bit hardware addresses, IPv6 automatically translates 48-bit MAC address to a 64-bit address by inserting a fixed (hardcoded) 16-bit value FFFE in between the vendor prefix and the device identifier. IPv6 calls these numbers "identifiers" to distinguish them from true 64-bit hardware addresses. For example, a 48-bit MAC address 00:25:96:12:34:56 appears on an IPv6 network as (commonly written in either of these two forms):

00:25:96:FF:FE:12:34:56
0025:96FF:FE12:3456

TCP/IP networks use both MAC addresses and IP addresses but for separate purposes. A MAC address remains fixed to the device's hardware while the IP address for that same device can be changed depending on its TCP/IP network configuration. Media Access Control operates at Layer 2 of the OSI model while Internet Protocol operates at Layer 3. This allows MAC addressing to support other kinds of networks besides TCP/IP.

IP networks manage the conversion between IP and MAC addresses using Address Resolution Protocol (ARP). The Dynamic Host Configuration Protocol (DHCP) relies on ARP to manage the unique assignment of IP addresses to devices.

Dynamic Addressing

In order to implement a scalable network architecture as depicted in FIG. 15, one adapted to interface with various sensor types and sensor access mechanisms, while providing real-time access to sensor data for distributed applications and organizations a dynamic addressing scheme is required. A data driven dynamic addressing scheme is disclosed that allows for the detection of a new virtual sensor, use the data and event generated by the virtual sensor to establish and send a message in real-time. New virtual sensors are discovered automatically by the FOI, which acts as a network access to the sensor array and maintains a virtual sensor addressing and sensor registry. The registry service may automatically assign new unique names to the new virtual sensors.

In an embodiment, the information that comprises the addressing scheme includes a numbering scheme in which the base is a standard IPv6 address, assigned to the fiber optic interrogator, followed by four brackets of numbers indicating specific location, magnitude, and time for each individual virtual sensor through hexadecimal data. In a standard IPv6 address; AAAA:BBBB:CCCC:DDDD:0000:0000:0000:0000, the first unused bracket will indicate the optical fiber span, the second will be the sensor itself, the third will be magnitude, and the fourth will be duration. An example would be: AAAA:BBBB:CCCC:DDDD:2506:2438D:19:606C, This conveys that sensor number 148,365 on line 9,478 felt a magnitude of 25 units for 24,684 units of time. Furthermore, this is all hosted by a single box, with support for up to 4,200,000,000 lines containing 4,200,000,000 individual sensors. If a second box were to be used, it would have a different IPv6 address base, changing only the first four brackets of numbers, allowing for an additional $1.76e^{19}$ sensors.

EXAMPLE

A numbering scheme in which the first four brackets of an IPv6 address are, as usual, the identification for a fiber optic interrogator. Attached to the IPv6 address are brackets of numbers used to represent sensor data. The number of brackets that can be attached is theoretically infinite, and in standard IPv6 style, all brackets contain hexadecimal numbers.

If a fiber optic interrogator's IPv6 address is 8A:65:94:70, then sub-netted beneath that address is a theoretically infinite number of brackets within a new address containing information such as movement received unto the fiber optic, magnitude of said movement, duration of said movement, temperature changes, and the introduction of outside light. Each bit of data may be encoded into hexadecimal format for space saving reasons. Hexadecimal can output to many bitrates, determining the maximum number based on space confinement, as demonstrated by the following table:

TABLE 1

| Bits | Max Hex Number | Max Decimal Number |
|------|----------------|--------------------|
| 8    | FF             | 256                |
| 16   | FFFF           | 65,535             |

TABLE 1-continued

| Bits | Max Hex Number      | Max Decimal Number     |
|------|---------------------|------------------------|
| 32   | FFFF FFFF           | 4,294,967,295          |
| 64   | FFFF FFFF FFFF FFFF | 18,446,744,073,709,551,616 |

Each bracket of a standard IPv6 address is a single 16 bit hexadecimal number. In an embodiment, the sub-netted dynamic address for each virtual sensor may be encoded in a maximum of 64 bit hexadecimal, allowing for over 18 quintillion possible outputs per bracket. Each bracket following will be able to contain the same amount of possible outputs, allowing for over 18 quintillion outputs for each variable, such as movement, magnitude, duration, temperature changes, outside light, or any other outputs conceivable.

Below is an example of a received dynamic address map relaying information from a virtual sensor:

>Fiber optic interrogator's address: 8A:65:94:70
>Fiber optic interrogator receives the following addressed signal: 38FB:A9C74:267E:2D:0

TABLE 2

|             | Line   | Sensor  | Magnitude | Duration | ΔT |
|-------------|--------|---------|-----------|----------|----|
| Hexadecimal | 38FB   | A9C74   | 267E      | 2D       | 0  |
| Decimal     | 14,587 | 695,412 | 9854      | 45       | 0  |

The Fiber optic interrogator then determines where to send the packaged information based on specific variables. Because there was no change in temperature, the data will not be sent to any systems or companies requesting temperature data. Because the duration of the signal received lasted for 45 units of time, the fiber optic interrogator determines that this is not mechanical strain, and is in fact an acoustic signal. It then sends the information received to any groups requesting acoustic data. Based on any predefined criteria, the fiber optic interrogator can determine where to send the received signals, weather that may be different amounts of time, different changes in heat, or different magnitudes of strain.

FIG. 13 depicts an acoustic event 1561 being detected by the fiber optic interrogator 1560, and the way it outputs an address to convey information about the type of event. An impact 1561 takes place on the fiber optic interrogator's 1560 12th line, so the first part of the address the interrogator sends out will be <C>. Next, the impact took place 3 miles down the fiber optic, so the distance in millimeters would be 4,828,000, and in terms of the hexadecimal address, <C:49AB60>. The magnitude of the event was measured to equate to 200,000 Newtons, so the address will now read <C:49AB60: 30D40>. Lastly, the duration of the impact force was 1500 milliseconds, so the full address will read <C:49AB60:30D40:5DC>. This address communicates that on line 12, 3 miles from fiber optic interrogator, a force of 200,000 Newtons was felt for 1.5 seconds. This address is then sent from the fiber optic interrogator 1560 to the cloud 1500 and from there, to the Strain Disambiguation system 1550. The Strain Disambiguation system reads that the event transpired for 1500 milliseconds (conveyed as <5DC> in the virtual sensors address), and determines that this event was acoustic due to its short duration.

Another event is detected by the same fiber optic interrogator 1560. The signal 1562 it receives indicates that the tower is at rest on the ground. In the same way as before, Line 12 at 3 miles distance, a force of 200,000 Newtons is felt in perpetuity, which would send the address C:49AB60:

249F0:895440>. In the same way as before, the signal is sent from the fiber optic interrogator 1560 to the cloud 1500 and from there, to the Strain Disambiguation system 1550, but this time, because the duration is continually growing, the Strain Disambiguation System categorizes this event as mechanical strain 1552.

FIG. 14 depicts a scenario in which multiple fiber optic interrogators detect a single event. The first fiber optic interrogator 1710 detects both a mechanic strain event 1562 and an acoustic event 1561. The addresses for these events will be different due to their varying forces or duration, based on pre-defined categories, as stated above. The signal from the first fiber optic interrogator 1710 is sent to the cloud 1500 and sorted to the correct system, either mechanical 1720 or acoustic 1710. The same acoustic 1561 and mechanical strain 1562 are detected by the second fiber optic interrogator 1715. They are also sent to the cloud for disambiguation between acoustic 1710 and mechanical strain 1720, but are archived separately because they were sent from a different fiber optic interrogator 1715. For instance, the first fiber optic interrogator 1710 detects an acoustic vibration on line 137, 2 miles out, with a magnitude of 1, for 0.125 seconds. The address that will be created for this event will be <AA:AA:AA:AA:89:311E38:1:7D> The second fiber optic interrogator 1715 detects the same event on line 137, 2 miles out, with a magnitude of 1, for 0.125 seconds, but because the box has a unique IPv6 address to start the sensor IP address it outputs will be different. It's IP address will be <BB:BB:BB:BB:89:311E38:1:7D>.

It is now clear that based on many variables, the address which reference a "virtual sensor" on each fiber optic line is a unique address which carries information about its trigger event. The virtual sensor's address can be the same as another sensor from another box, but they are recognized as separate because their addresses are sub-netted under unique fiber optic interrogator IPs.

Non-Transitory Computer Readable Medium

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects, a computer readable medium may comprise non-transitory computer readable medium (e.g., tangible media). In addition, in some aspects a computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

It is to be understood that the claims are not limited to the precise configuration and components illustrated above. Various modifications, changes and variations may be made in the arrangement, operation and details of the methods and apparatus described above without departing from the scope of the claims.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A dynamic addressing scheme for a fiber optic interferometry system, comprising:
    a fiber optic interferometer operatively configured as a fiber optic interrogator to detect an event along a fiber optic span, wherein a location of the event detected is determined based, at least in part, on a time delay of arrival of a transmitted signal to a received backscattered signal, wherein the time delay is based on the speed of light in the fiber;
    a first processor operative to:
        receive the backscattered signal from the fiber optic span,
        determine a type of the event,
        determine a magnitude of the event,
        interrogate the event, wherein interrogation is for at least one of a predetermined time and an event duration,
        dynamically create a unique internet address derived from at least one of the type of the event, the magnitude of the event, and a time of the event,
        append a message with the unique internet address, and broadcast the message through a network, wherein the network uses the unique internet address to route the message to a predetermined address,
    a second processor operative to:
        use a predetermined address scheme to receive event messages from the network,
        responsive to receiving one of the event messages, use the unique internet address appended to the message to determine at least one of the type of the event, the magnitude of the event, and the time of the event,
        responsive to determining the at least one of the type of the event, the magnitude of the event, and the time of the event use a first application to process data contained in the message,
        log the data contained in the message to a memory.

2. The system of claim 1, wherein the fiber optic span comprises at least one of a single-mode type, a multimode type, and a polarization preserving type fiber optic cable.

3. The system of claim 1, wherein the fiber optic span is configured to detect at least one type of strain, wherein the type of strain may be acoustic, electromagnetic, mechanical, or thermal.

4. The system of claim 1, wherein the backscattered signal is generated from at least one of acoustic pressure waves, electromagnetic fields, mechanical strain or pressure, and thermal strains or pressures.

5. The system of claim 1, wherein the first processor is at least one of local and remote to the fiber optic interrogator.

6. The system of claim 1, wherein the second processor is located within a remote device.

7. The system of claim 6, wherein the remote device is one of a remote server, a smart phone, a tablet, a laptop, and a personal computer.

8. The system of claim 1, wherein the memory is located within at least one of the first processor, the second processor, and a remote server.

9. The system of claim 1, wherein at least one of the first and second processor is further configured to at least one of characterize and classify the event based on the unique internet address.

10. The system of claim 1, wherein the message is routed in real-time.

11. A method for dynamically addressing events in a fiber optic interferometry system, comprising:
    configuring a fiber optic interferometer operatively configured as a fiber optic interrogator to detect an event along a fiber optic span, wherein a location of the event detected is determined based, at least in part, on a time delay of arrival of a transmitted signal to a received backscattered signal, wherein the time delay is based on the speed of light in the fiber;
    configuring a first processor to:
        receive the backscattered signal from the fiber optic span,
        determine a type of the event,
        determine a magnitude of the event,
        interrogate the event, wherein interrogation is for at least one of a predetermined time and an event duration,
        dynamically create a unique internet address derived from at least one of the type of the event, the magnitude of the event, and the time of the event,
        responsive to creating the unique internet address, append a message with the unique internet address, and broadcast the message through a network, wherein the network uses the unique internet address to route the message to a predetermined address,
    configuring a second processor to:
        use a predetermined address scheme to receive event messages from the network,
        responsive to receiving one of the event messages use the unique internet address appended to the message to determine at least one of the type of the event, the magnitude of the event, and the time of the event, responsive to determining the at least one of the type of the event, the magnitude of the event, and the time of the event use a first application to process data contained in the message, log the data contained in the message to a memory.

12. The method of claim 11, wherein the fiber optic span comprises at least one of a single-mode type, a multimode type, and a polarization preserving type fiber optic cable.

13. The method of claim 11, wherein the fiber optic span is configured to detect at least one type of strain, wherein the types of strain may be acoustic, electromagnetic, mechanical, and thermal.

14. The method of claim 11, wherein the backscattered signal is generated from at least one of acoustic pressure waves, electromagnetic fields, mechanical strains or pressures, and thermal strains or pressures.

15. The method of claim 11, wherein the first processor is at least one of local and remote to the fiber optic interrogator.

16. The method of claim 11, wherein the second processor is located within a remote device.

17. The method of claim 16, wherein the remote device is one of a smart phone, a tablet, a laptop, and a personal computer.

18. The method of claim 11, wherein the memory is located within at least one of the first processor, the second processor, and a remote server.

19. The method of claim 11, wherein at least one of the first and second processor is further configured to at least one of characterize and classify the event based on the unique internet address.

20. The method of claim 11, wherein the message is routed in real-time.

* * * * *